United States Patent [19]
Fujino et al.

[11] Patent Number: 5,623,296
[45] Date of Patent: Apr. 22, 1997

[54] INTERMEDIATE TRANSFER INK JET RECORDING METHOD

[75] Inventors: Makoto Fujino; Toshio Kumagai; Michinari Tsukahara; Yoshie Hosono; Hiroto Nakamura; Yoshiyuki Koike; Makoto Matsuzaki; Fumie Uehara; Osamu Ishibashi, all of Suwa, Japan

[73] Assignee: Seiko Epson Corporation, Tokyo-To, Japan

[21] Appl. No.: 199,129

[22] PCT Filed: Jul. 2, 1993

[86] PCT No.: PCT/JP93/00914

§ 371 Date: Feb. 25, 1994

§ 102(e) Date: Feb. 25, 1994

[87] PCT Pub. No.: WO94/01283

PCT Pub. Date: Jan. 20, 1994

[30] Foreign Application Priority Data

| Jul. 2, 1992 | [JP] | Japan | 4-175384 |
| Jul. 2, 1992 | [JP] | Japan | 4-175385 |
| Jul. 2, 1992 | [JP] | Japan | 4-175386 |
| Jul. 2, 1992 | [JP] | Japan | 4-175387 |
| Oct. 16, 1992 | [JP] | Japan | 4-278938 |
| Nov. 5, 1992 | [JP] | Japan | 4-296109 |
| Nov. 5, 1992 | [JP] | Japan | 4-296110 |
| Nov. 5, 1992 | [JP] | Japan | 4-296111 |
| Jan. 6, 1993 | [JP] | Japan | 5-000665 |

[51] Int. Cl.⁶ ..................... B41J 2/01
[52] U.S. Cl. ............., 347/103; 347/100; 106/20 D
[58] Field of Search ............ 347/103, 100, 347/99; 106/20 D

[56] References Cited

U.S. PATENT DOCUMENTS

| 3,898,670 | 8/1975 | Erikson | 347/103 X |
| 4,538,156 | 8/1985 | Durkee | 347/103 X |
| 5,099,256 | 3/1992 | Anderson | 347/103 |
| 5,345,254 | 9/1994 | Wong | 347/100 |
| 5,382,283 | 1/1995 | Yui | 106/20 D X |

FOREIGN PATENT DOCUMENTS

| 0571190 | 2/1987 | European Pat. Off. | C09D 11/00 |
| 52-125011 | 10/1977 | Japan | C09D 11/00 |
| 57-70668 | 5/1982 | Japan | B41J 3/04 |
| 60-076343 | 3/1985 | Japan | B41F 17/00 |
| 62-149452 | 7/1987 | Japan | B41J 3/04 |
| 64-1777 | 1/1989 | Japan | C09D 11/00 |
| 1-127358 | 5/1989 | Japan | B41J 3/04 |
| 402209244 | 8/1990 | Japan | B41J 2/01 |
| 3-55233 | 5/1991 | Japan | B41J 2/32 |
| 3-169634 | 7/1991 | Japan | B41J 2/01 |
| 3-284948 | 12/1991 | Japan | B41J 2/01 |

OTHER PUBLICATIONS

Patent Abstracts of Japan, vol. 9, No. 215 (M409) (1938) 3 Sep. 1985.

Primary Examiner—Joseph W. Hartary
Attorney, Agent, or Firm—Ladas & Parry

[57] ABSTRACT

Two intermediate transfer ink jet recording methods and a recording device suitable for practicing the methods and an ink composition for use in the methods are disclosed. The first recording method comprises forming jetting an ink composition containing a thermoplastic resin on an intermediate transfer drum to form an ink image, heating the ink image to at least the softening or melting temperature of the thermoplastic resin to bring the ink image to a film form and then transferring the ink image to recording paper. The second recording method comprises jetting an ink composition containing a thermoplastic resin on an intermediate transfer drum to form an ink image, heating the ink image to form a concentrated ink image, transferring the concentrated ink image to recording paper and then heating the transferred ink image to at least the softening or melting temperature of the thermoplastic resin. According to the recording methods of the present invention, a good print can be provided independently of the quality of the recording paper and even under a low transfer pressure.

20 Claims, 9 Drawing Sheets

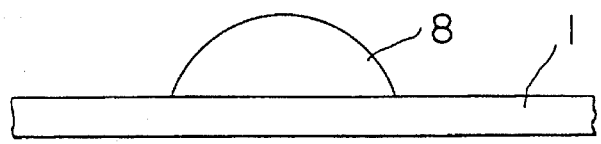
F I G. 3 (a)
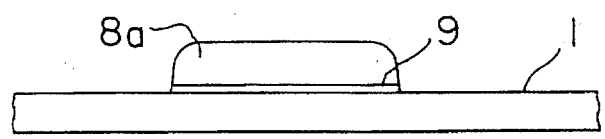
F I G. 3 (b)
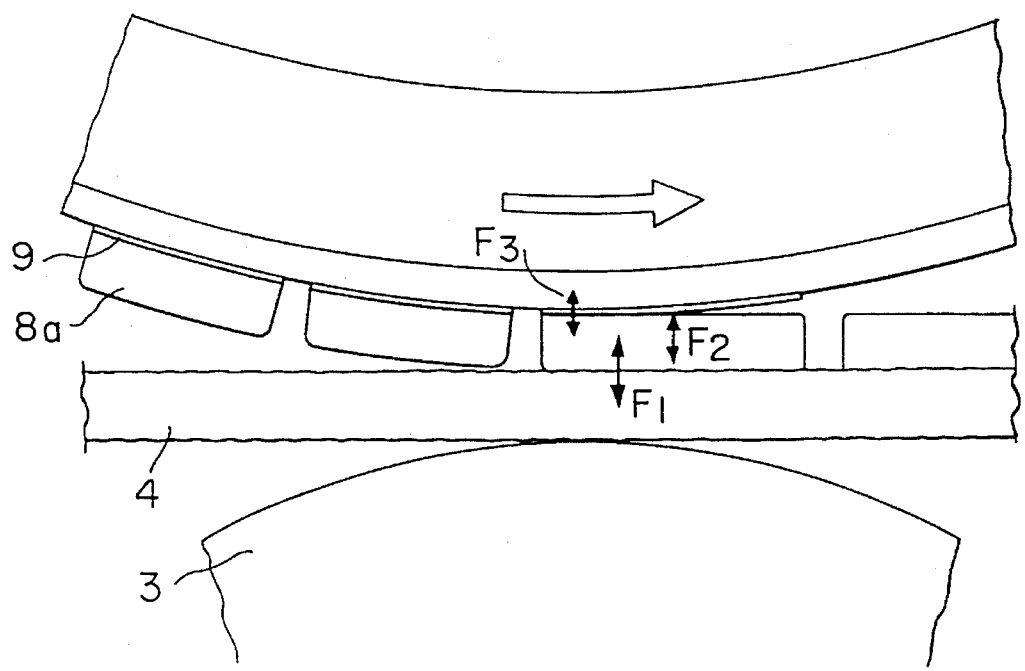
F I G. 4

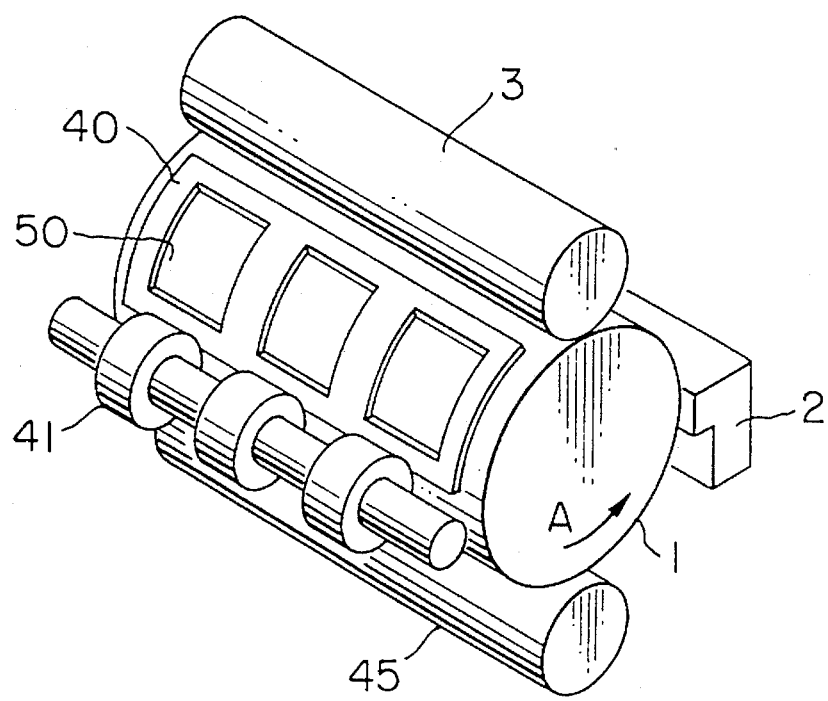
F I G. 14
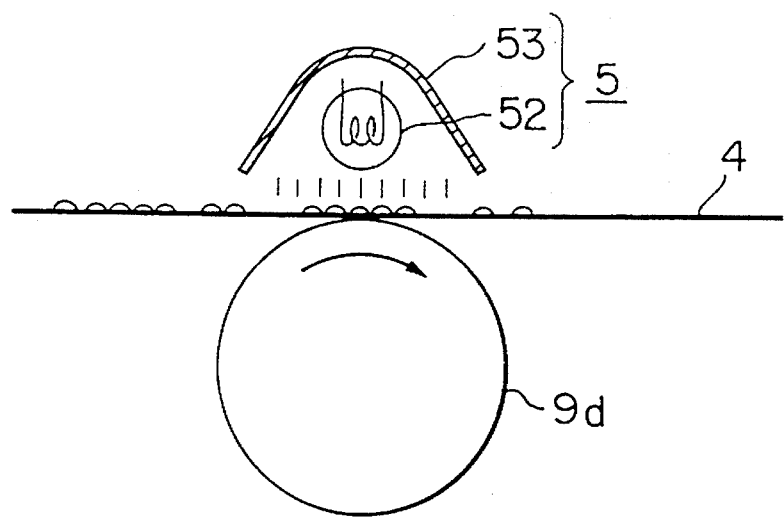
F I G. 15

INTERMEDIATE TRANSFER INK JET RECORDING METHOD

BACKGROUND OF THE INVENTION

1. Field of the Invention

The present invention relates to an ink composition for use in an intermediate transfer ink jet recording device and an intermediate transfer ink jet recording method and an intermediate transfer ink jet recording device using the ink composition.

2. Background Art

An ink jet recording system is advantageously excellent in the simplicity of the mechanism and noiseless. This type of printing, however, has problems including that the quality of prints varies depending upon recording media (for example, depending upon properties of recording paper) and also including that the image of a portion remaining undried of an ink image is disturbed when the recording medium is discharged. In order to cope with such problems, a proposal has been made on a method called an "intermediate transfer system" wherein an ink image is once formed on a transfer medium by an ink jet recording process and then transferred to a recording medium (Japanese Patent Laid-Open No. 225958/1984 and U.S. Pat. No. 4,538,156). In this method, a recording head can be disposed apart from the recording paper. Consequently, this method successfully prevents the recording head from clogging which is due to the possibility that the recording head contacts with the recording paper since they are disposed closely or that paper lint from the recording paper is attached to the recording head. However, in the intermediate transfer ink jet recording method, there is room for an improvement in the quality of the image transferred on the recording medium.

Furthermore, Japanese Patent Laid-Open Nos. 2849/1987, 169643/1991 and 284948/1991 and U.S. Pat. No. 5,099,256 propose a method which comprises the steps of ejecting ink droplets on a transfer medium to form an ink image, evaporating a large proportion of water in the ink image to dehydrate the ink image to a substantially dry state and transferring the concentrated ink to recording paper. In this transfer ink jet recording method, however, high pressure is necessary for transferring the ink image to the recording medium, since the bonding force between the recording medium and the ink image is small. The provision of means for applying necessary pressure renders the recording device complicated.

SUMMARY OF THE INVENTION

Accordingly, an object of the present invention is to provide an ink composition for intermediate transfer ink jet recording that enables an excellent quality and a good fixing strength of prints to be attained independently of a recording medium used.

Another object of the present invention is to provide an ink composition for intermediate transfer ink jet recording that is free from the clogging of the ink jet recording head and can simplify the transfer and fixing operation.

A further object of the present invention is to provide an intermediate transfer ink jet recording method using the above ink composition for ink jet recording, which method enables an excellent quality and a good fixing strength of prints to be attained independently of a recording medium used.

A further object of the present invention is to provide an intermediate transfer ink jet recording method that enables a good ink image to be transferred from an intermediate transfer medium to a recording medium under low pressure.

A further object of the present invention is to provide an intermediate transfer ink jet recording device suitable for an ink jet recording method using the above ink composition.

The intermediate transfer ink jet recording method according to the first aspect of the present invention comprises the steps of:

ejecting an ink composition comprising water, a thermoplastic resin, a colorant and a water-soluble organic solvent on an intermediate transfer medium to form an ink image;

heating the ink image to at least the softening or melting temperature of the thermoplastic resin; and transferring the ink image in the heated state on the transfer medium to a recording medium.

The intermediate transfer ink jet recording method according to the second aspect of the present invention comprises the steps of:

ejecting an ink composition comprising water, a thermoplastic resin, a colorant and a water-soluble organic solvent and, when the thermoplastic resin is a water-insoluble resin, further comprising a water-soluble polymer on an intermediate transfer medium to form an ink image;

concentrating the ink image;

transferring the ink image in the heated state on the transfer medium to a recording medium; and heating the ink image on the recording medium to at least the softening or melting temperature of the thermoplastic resin.

The ink composition for use in the intermediate transfer ink jet recording method according to the first aspect of the present invention comprises water, a thermoplastic resin, a colorant and a water-soluble organic solvent.

The ink composition for use in the intermediate transfer ink jet recording method according to the second aspect of the present invention comprises water, a thermoplastic resin, a colorant and a water-soluble organic solvent and, when the thermoplastic resin is a water-insoluble resin, further comprises a water-soluble polymer.

The first intermediate transfer ink jet recording device according to the present invention comprises:

an intermediate transfer medium;

recording means for ejecting droplets of an ink composition comprising water, a thermoplastic resin, a colorant and a water-soluble organic solvent to form an ink image on the intermediate transfer medium;

heating means for heating the ink image on the intermediate transfer medium to at least the softening or melting temperature of the thermoplastic resin; and transfer means for pressing the ink image formed on the intermediate transfer medium against a recording medium to transfer the ink image to the recording medium.

The second intermediate transfer ink jet recording device according to the present invention comprises:

an intermediate transfer medium;

recording means for ejecting droplets of an ink composition comprising water, a thermoplastic resin, a colorant and a water-soluble organic solvent and, when the thermoplastic resin is a water-insoluble resin, further comprising a water-soluble polymer to form an ink image on said intermediate transfer medium;

first heating means for concentrating the ink image formed on the intermediate transfer medium;

transfer means for pressing the ink image formed on the intermediate transfer medium against a recording medium to transfer the ink image to the recording medium; and second heating means for heating the ink image on the recording medium to at least the softening or melting temperature of the thermoplastic resin.

BRIEF DESCRIPTION OF THE DRAWINGS

FIG. 3(a) is a schematic view of a form of an ink image immediately after formed on the transfer drum of the recording device according to the present invention;

FIG. 3(b) is a schematic view of the form of an ink image brought to a film form on the transfer drum of the recording device according to the present invention, together with a "peeling layer" formed between the ink image and the transfer drum;

FIG. 4 is a schematic diagram showing the transfer of an ink image to the recording medium in the recording device according to the present invention;

FIG. 14 is a partially perspective view of the device shown in FIG. 13; and

FIG. 15 is a schematic view of a preferred embodiment of the second heating means in the recording method according to the second aspect of the present invention.

DETAILED DESCRIPTION OF THE INVENTION

Recording Method and Device

According to the present invention, there are provided two recording methods and two devices for the methods. In the ink jet recording method according to the first aspect of the present invention, an ink composition comprising water, a colorant, a thermoplastic resin and a water-soluble organic solvent is employed (This method is hereinafter often referred to as "recording method A". The device used for practicing this method is hereinafter referred to as "recording device A"). In the ink jet recording method according to the second aspect of the present invention, an ink composition comprising water, a colorant, a thermoplastic resin and a water-soluble organic solvent and, when the thermoplastic resin is a water-insoluble resin, further comprising a water-soluble polymer is employed (This method being hereinafter often referred to as "recording method B". The device used for practicing this method is hereinafter referred to as "recording device B").

The recording method A and the recording device A according to the present invention will now be described with reference to the accompanying drawings.

Figure 1:
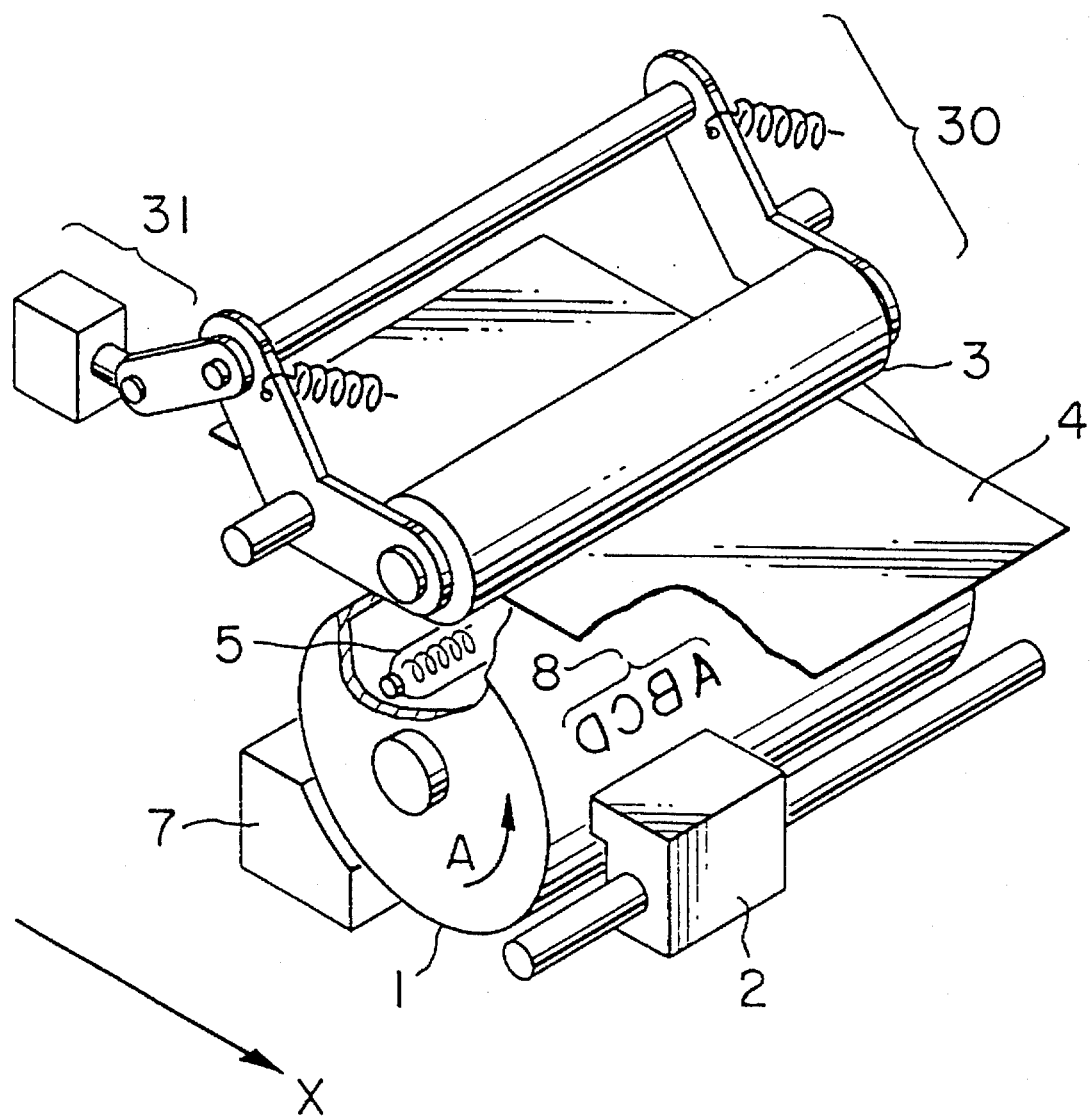
FIG. 1 is a perspective view of an ink jet recording device for the ink jet recording method according to the first aspect of the present invention.
Figure 2:
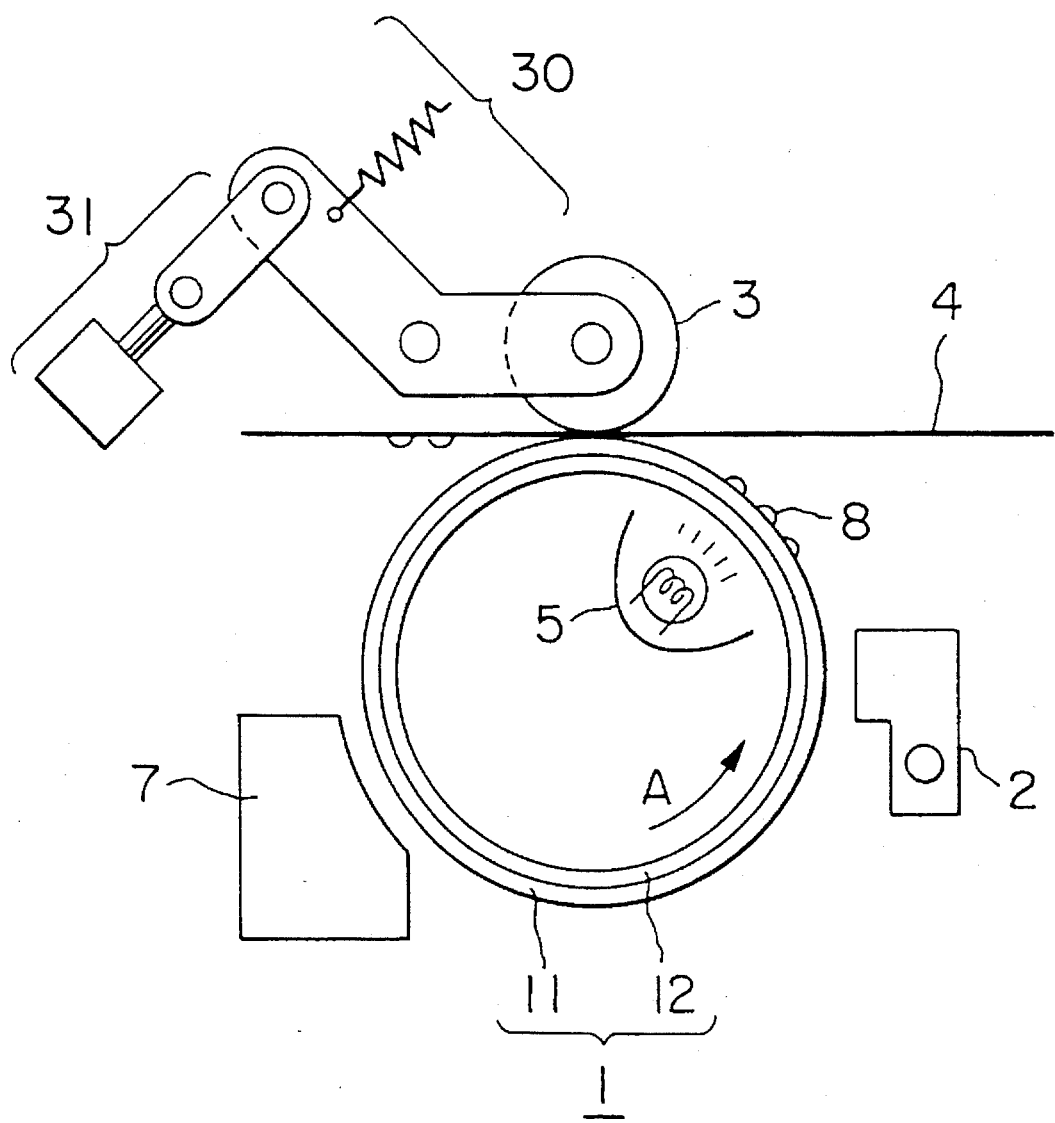
FIG. 2 is a cross-sectional view in the direction of X of the device shown in FIG. 1.

FIG. 1 is a perspective view of a device for the recording method A according to the present invention. FIG. 2 is a cross-sectional view in the direction of X of the device shown in FIG. 1. This device comprises a transfer drum 1 as an intermediate transfer medium and ink jet recording means 2 and a pressure roller 3 which are disposed around the transfer drum 1 from the upstream side in the direction of rotation of the transfer drum 1.

The transfer drum 1 comprises an elastic layer 11 constituting the surface of the drum 1 and an internal drum 12. A recording medium 4 is sandwiched and supported between the transfer drum 1 and the pressure roller 3, and carried with the rotation of the recording drum 1 and the pressure roller 3. The transfer drum 1 is heated by a heater 5 which is heating means provided inside the transfer drum 1. The heater 5 heats the surface of the transfer drum 1 to at least the softening or melting temperature of the thermoplastic resin contained in the ink so that the ink image can be transferred in the following manner. (The transfer in the following manner is hereinafter often referred to as "interfacial transfer". The ink image ready for the interfacial transfer is hereinafter often referred to as an ink image "brought to a film form".) The pressure roller 3 can press the recording medium 6 against the transfer drum 1 by taking advantage of the pressure applied by pressurizing means 30. If necessary, the pressing of the pressure roller 3 against the recording medium 6 can be released by pressure release means 31. Furthermore, if necessary, cleaning means 7 for removing a remaining ink or the like after the transfer of the ink image may be provided downstream of the pressure roller 3.

In this device, printing is effected as follows. Firstly, recording means 2 (an ink jet recording head) ejects droplets of the ink composition onto the transfer drum 1 to form an ink image 8. The ink image 8 immediately after it is formed can take a form as shown in FIG. 3(a). The ink image 8 is heated on the transfer drum 1 by the heater 5. The heating causes the solvent to be evaporated from the ink image 8. This increases the solid component concentration. Finally, an agglomerate consisting essentially of solid components is formed on the transfer drum 1. Furthermore, since the agglomerate is heated on the transfer drum 1 to at least the softening or melting temperature of the thermoplastic resin contained in the ink, particles constituting the agglomerate of solid components are softened or melted. As a result, they are mutually dissolved and homogenized to bring the ink image to an ink image 8a in a film form having a substantially homogeneous thickness as shown in FIG. 3(b). The surface of the ink image 8a is viscous in the heated state.

More interestingly, in the ink composition of the present invention, a layer 9 of a water-soluble organic solvent (hereinafter often referred to as a "peeling layer") is formed between the ink image 8a and the transfer drum 1 with forming the ink image 8a. (An expected mechanism through which the peeling layer is formed will be described later.) As is apparent from the following description, the formation of the layer 9 is advantageous for the interfacial transfer.

Subsequently, the ink image 8a in the heated state is carried to a region facing the pressure roller 3 with the rotation of the transfer drum 1 and then transferred to the recording medium 4. This will now be described in more detail with reference to FIG. 4. In this device, the transfer drum 1 is pressed through the recording medium 4 against the pressure roller 3. In the recording method according to the present invention, three forces, that is, an adhesive force (F1) between the ink image 8a and the recording medium 4, a cohesive force (F2) of the ink image 8a and an adhesive force (F3) between the ink image 8a and the surface of the transfer roller 1 have the relationship F1>F2>F3. Therefore, one interface of the ink image 8a is wholly peeled off from the surface of the transfer drum 1 whereas the other interface of the ink image is wholly adhered to the recording medium 4. Especially, the presence of the layer 9 of the organic solvent is advantageous because the F3 value becomes smaller. Thus, the ink image 8a is peeled and adhered at its interface, so that the untransferred remaining image can be effectively prevented. Furthermore, in the present invention, it is possible to realize a large F1 force, which enables transfer to be successfully effected even when the pressure applied by the pressure roller 3 is low.

According to a preferred embodiment of the present invention, the ink composition may further comprises a saccharide. The saccharide serves to bind the solid component in the ink image to increase the cohesive force F2 and, at the same time, to increase the adhesive force F1 when the ink image has been brought to a film form. As a result, stable cohesive force F2 which stabilizes the ink image can be obtained independently of the printing pattern, so that not only good transfer and printing can be effected but also the ink image can be transferred from the transfer drum to the transfer medium under low pressure. In addition, the saccharide serves to stably impart the increased adhesive force to the ink image for a long period of time. Therefore, the time taken from the formation of the ink image to the transfer of the ink image can be advantageously set at will.

A further great advantage of the present invention is that a thickness of about 2 to 10 μm suffices as the thickness of the ink image brought to a film form on the transfer drum for finally obtaining a sufficient image density (for example, 1.4 or more of the OD value) on the recording medium 4. Specifically, in the case of the conventional intermediate transfer ink jet recording method, the pressure applied in the transfer of the ink image to the recording medium is so high that the ink image is unfavorably deformed (that is, defaced), which causes the deterioration in the quality of the image. By contrast, in the present invention, the thickness of the ink image on the transfer drum 1 is about 2 to 10 μm, that is, sufficiently smaller than 120 μm which is the diameter of one dot as the minimum pixel in 300 dpi recording. Therefore, the present invention is advantageous also in that the deformation of the ink image is so small that no defacing of the image is observed in the transfer of the image to the recording medium.

In the recording method according to the present invention, good transfer can be effected independently of the kind of the recording medium, more specifically, independently of the surface profile of the recording paper. The ink image 8a can be transferred in "one" onto the recording medium 4 since the ink image 8a brought to a film form has a certain cohesive force F2. Even though the recording medium is significantly uneven (for example, bond paper), the ink image 8a can be transferred with maintaining its shape because the ink image 8a can be adhered to the recording medium with an adhesive force attained merely by the contact of the ink image 8a with protrusions of the recording medium. Therefore, good transfer can be provided as no deficiency of the image attributable to the uneven surface of the recording medium occurs.

Thereafter, the ink image 8a transferred to the recording medium 4 is not heated any more and then solidified. Even after the solidification, the adhesive force F1 of the ink image 8a remains still large, so that a good fixation of the ink image can be provided.

The term "ink image" used herein is intended to mean both an image consisting of one dot as the minimum pixel alone and an image comprising a gathering of a plurality of dots adjacent and connected to each other.

The recording method B and the recording device B for the recording method B according to the present invention will now be described with reference to the accompanying drawings.

Figure 5:
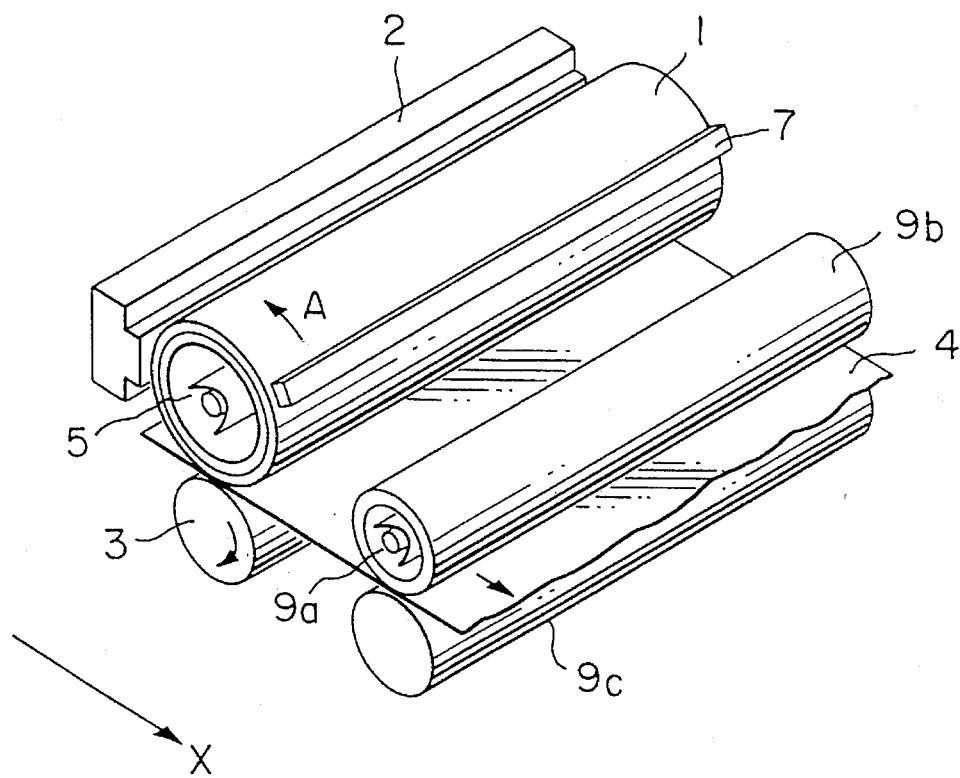
FIG. 5 is a perspective view of an ink jet recording device for the ink jet recording method according to the second aspect of the present invention.
Figure 6:
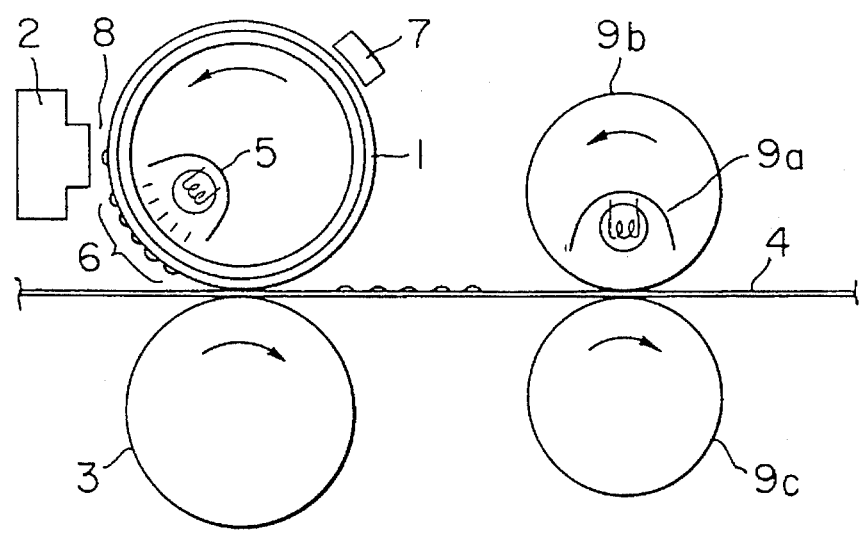
FIG. 6 is a cross-sectional view in the direction of X of the device shown in FIG. 5.

FIG. 5 is a schematic cross-sectional view of a device for the recording method B according to the present invention. FIG. 6 is a cross-sectional view in the direction of X of the device shown in FIG. 5. The some parts of this device is the same as that of the device shown in FIG. 1. In FIGS. 5 and 6, the parts common to FIGS. 5 and 6 and FIG. 1 are indicated with the same reference numerals. The difference of the devices shown in FIGS. 5 and 6 from the device shown in FIG. 1 is, firstly, that a heat 5 "concentrates" the ink image formed on the transfer drum 1 in such a manner that the ink image can be transferred by the interfacial transfer. In addition, this device is further provided with heating means 9. In this embodiment, the heating means 9 comprises a roller 9b internally having a heating element 9a and a roller 9c facing the roller 9a with a recording medium between the rollers 9b and 9c. The heating means 9 is constructed so that the surface of the recording medium is heated to at least the softening or melting temperature of the thermoplastic resin contained in the ink.

Printing is performed as follows. Firstly, recording means 2 ejects droplets of the ink composition onto the transfer drum 1 to form an ink image 8 on the transfer drum. The ink image 8 can take a form as shown in FIG. 3(a) as the recording method A. The formed ink image 8 is heated on the transfer drum 1 by the heating means 5. The heating causes the solvent to be evaporated from the ink image 8. In this case, the heating is effected in such a manner that the thermoplastic resin contained in the ink composition is neither softened nor melted. Specifically, the heating in this recording method and the heating in the recording method A are common to evaporation of most water in the ink image to enhance the solid component concentration. However, this recording method is different from the recording method A in that the thermoplastic resin contained in the ink composition is neither softened nor melted. The heating increases the solid component concentration. Finally, an agglomerate consisting of solid components is formed on the transfer drum 1. The agglomerate has a cohesive force considered attributable to the water-soluble thermoplastic resin or the water-soluble polymer incorporated when the thermoplastic resin is a water-insoluble resin. This cohesive force brings the ink image to an ink image 8a in a film form having a substantially homogeneous thickness as shown in FIG. 3(b). The surface of the ink image 8a is viscous in the heated state. As a result, interestingly, the concentrated ink image can be transferred to the recording medium by the interfacial transfer. (Therefore, in the recording method B, as in recording method A, the ink image in this state is often called an ink image "brought to a film form".) The way of the "concentration" is not limited to any specific embodiment so far as, as described above, it serves to increase the solid component concentration of the ink image while preventing the softening or melting the thermoplastic resin. However, it is preferred to use any one of a method where a large amount of energy is applied in a short time to evaporate the solvent (for example, heating is effected at a temperature of 100° C. or above in a short time) and a method where heating is effected at a low temperature (for example, at a temperature of 100° C. or below) for a relatively long period of time to evaporate the solvent.

According to a further preferred embodiment of the present invention, the ink composition used in this method contains a water-soluble polymer even when the thermoplastic resin is a water-soluble resin. The agglomerate, i.e., the ink image 8 brought to a film form is conveyed to a region facing the pressure roller 3 with the rotation of the transfer drum 1 and then transferred to the recording medium 4. Also in this case, the three forces, i.e., the adhesive force (F1) between the ink image 8 and the recording medium 4, the cohesive force (F2) of the ink image 8 and the adhesive force (F3) between the ink image 8 and the surface of the transfer roller 1 have the relationship F1>F2>F3, so that the ink image can be transferred by the interfacial transfer.

Also in this case, when the ink composition contains an organic solvent, an organic solvent layer 9 is formed. As a result, F3 becomes smaller, which is advantageous for the interfacial transfer.

Also in the recording method B, an ink composition containing a saccharide may be employed. This enables the recording method B to enjoy the advantage as described in connection with the recording method A.

In this embodiment, the ink image transferred to the recording medium is then heated by the heating means 9. Since the heating temperature is at least the softening or melting temperature of the thermoplastic resin contained in the ink, particles constituting the agglomerate of solid components are softened or melted and mutually dissolved in one another to form a homogeneous ink image in a film form. As a result, improvements in cohesive force within the ink image and also in adhesion to the recording medium can be attained, so that a good print quality can be realized.

Also in the recording method B, a thickness of about 2 to 10 μm suffices as the thickness of the ink image brought to a film form on the transfer drum for finally obtaining a sufficient image density (for example, 1.4 or more of the OD value) on the recording medium 4. Therefore, recording method B also can enjoy the advantage that a deterioration in the image due to defacing of the image is hardly observed.

The device according to the present invention will now be described in more detail.

The elastic layer 11 of the transfer drum 1 preferably comprises a rubber material, particularly preferably comprises a material that permits an ink image to be easily peeled off therefrom and is heat-resistant. Preferred examples of the rubber material include a chloroprene rubber, a nitrile rubber, an ethylene/propylene rubber, a silicone rubber, a fluorosilicone rubber, a fluororubber, a natural rubber, a styrene rubber, an isoprene rubber, a butadiene rubber, an ethylene/propylene/butadiene polymer and a nitrile/butadiene rubber. A silicone rubber, a fluorosilicone rubber and a fluororubber are preferred from the viewpoint of heat resistance.

As described above, the ink ejected as an ink droplet forms an ink image 8 on the transfer drum 1. If the ink image 8 is repelled or flows on the transfer drum, no desired ink image (for example, having a desired dot diameter) can be realized. In order to prevent this unfavorable phenomenon, it is preferred to use an ink composition adjusted to have a suitable capability of wetting the surface of the transfer drum by adding a surfactant.

The image on the transfer drum 1 is formed with the ink jet recording means 2. Examples of the recording means 2 include an ink jet recording head using a piezoelectric element.

Figure 7:
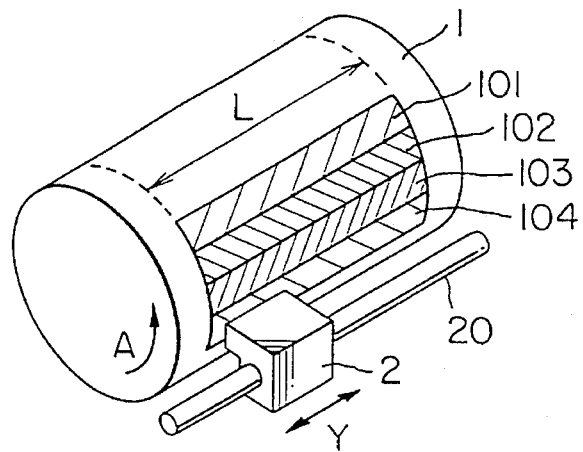
FIG. 7 is a diagram showing an ink jet recording device according to the present invention, wherein an image is intermittently formed as a striped region on a transfer drum.

An image on the transfer drum 1 with this recording head 2 can be formed by using various methods. The formation of the image by using the transfer drum 1 and the recording head 2 shown in FIG. 1 will now be described as an example with reference to FIG. 7. In the device shown in FIG. 7, scanning is performed in the direction of arrow Y along a carriage shaft 20 parallel to the shaft of the transfer drum 1. While the recording head 2 reciprocates along the carriage shaft, the head effects printing when it is in a printing region L except that the printing is suspended when the recording head 2 is outside the region L. The rotation of the transfer drum 1 is suspended when the recording head 2 is in the region L. On the other hand, the transfer drum 1 is rotated in the direction of A shown in the Figure at a given angle when the recording head 2 is outside the region L. The repetition of the reciprocated scanning of the recording head 2 with the intermittent rotation of the transfer drum 1 causes a region having an image formed on the transfer drum 1 to be increased as a striped region. As shown FIG. 7, striped regions 101, 102, 103 and 104 are successively formed.

Figure 8:
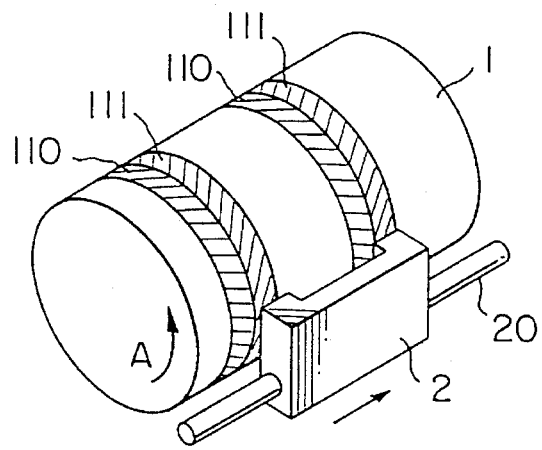
FIG. 8 is a diagram showing an ink jet recording device according to the present invention, wherein an image is formed in a spiral form on a transfer drum.

In a device shown in FIG. 8, the recording head 2 is moved at a given rate along the carriage shaft 20 parallel to the shaft of the transfer drum 1 while rotating the transfer drum 1 at a given rate. As a result, regions 110, 111 printed on the transfer drum 1 are increased in a spiral form. In this device, the recording head 2 has two ink jet recording heads.

Figure 9:
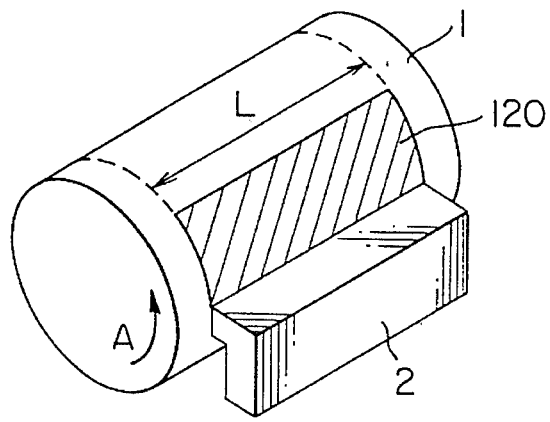
FIG. 9 is a diagram showing an ink jet recording device according to the present invention, which has a recording head having nozzles provided over the whole printing region.

In a device shown in FIG. 9, a recording head 2 all over the printing region L is employed. In this device, the recording head 2 is fixed. The transfer drum 1 is rotated at a given rate, which causes a printing region 120 to be continuously increased in the circumferential direction of the transfer drum.

Among the above image forming methods, in the device shown in FIG. 8, the transfer of the ink image onto the recording medium should be effected after one page of an ink image is formed on the transfer drum 1. On the other hand, in the devices shown in FIGS. 7 and 9, the transfer of the ink image onto the recording medium may be effected after one page of an ink image is formed on the transfer drum 1 (provided that the circumferential length of the transfer drum 1 is sufficient to record one page of ink image), or alternatively the transfer may be effected in the course of the formation of one page of the ink image. For example, in a device shown in FIG. 7, i.e., a device shown in FIG. 1, the pressure roller 3 is aparted from the transfer drum 1 by the pressure release means 31 (the recording medium 4 as well remaining uncarried yet) until one page of the ink image is formed on the transfer drum 1. After one page of the ink image is formed on the transfer drum 1 and the ink image is brought to a film form by heating, the pressure roller 3 is pressed against the transfer drum 1 by the pressurizing means 30. At the same time, the recording medium 4 is carried to transfer the ink image onto the recording medium 4. On the other hand, when the ink image to the recording medium is transferred in the course of the formation of one page of the ink image on the transfer drum, the process is performed as follows. Specifically, the pressure roller 3 is previously pressed against the transfer drum 1 by the pressurizing means 30. The ink image brought to a film form by heating is continuously transferred to the recording medium 4 before one page of the ink image is completely formed.

The heater 5 heats the surface of the transfer drum 1 to at least the softening or melting temperature of the thermoplastic resin contained in the ink composition so that the ink image can be brought to a film form. The heating temperature may be arbitrarily determined by taking the recording conditions such as the ink image forming method into consideration. When the softening or melting temperature is between 50° C. and 150° C., the image is heated in such a manner that the temperature is at least the softening or melting temperature of the thermoplastic resin and preferably in the range of from 50° to 200° C., still preferably in the range of from 50° to 180° C.

Although specific heating means may be arbitrarily selected, preferred examples of the heating means include a combination of a heater lamp with a reflecting mirror.

Figure 10:
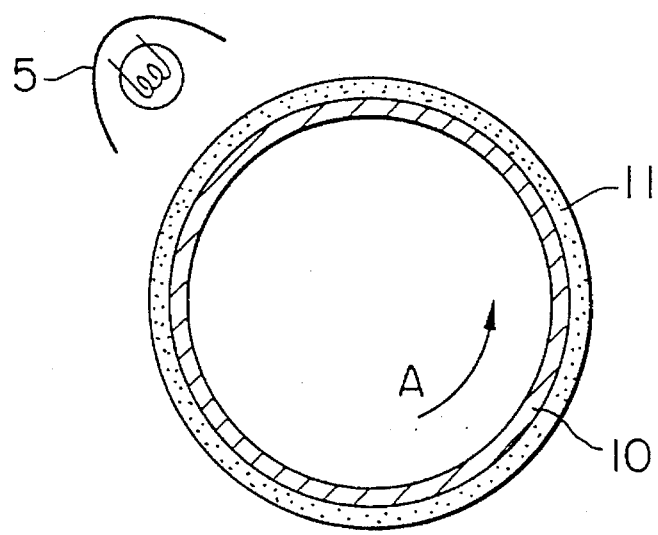
FIG. 10 is a diagram showing an ink jet recording device according to the present invention, which has a heater provided outside a transfer drum.

As shown in FIG. 10, the heater 5 may be provided outside the transfer drum 1 but not inside the transfer drum 1. This embodiment is advantageous in that the ink image alone can be directly heated and reduce the heat conduction to the portion other than the ink image, for example, recording head 2. In addition, the warm up time taken for reaching a desired temperature in the transfer drum 1 can be shortened.

Figure 11:
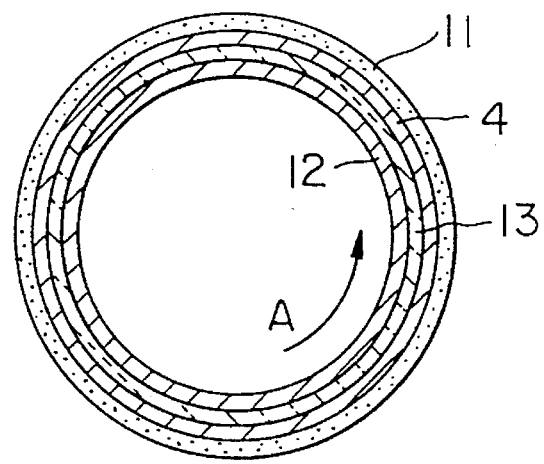
FIG. 11 is a diagram showing an ink jet recording device according to the present invention, which has a heater and a transfer drum integrally constructed.

As shown in FIG. 11, the transfer drum may be provided integrally with the heating means. In this embodiment, a heater layer 14 (for example, a ceramic heater) is provided on the insulating layer 13 which is provided on an internal drum 12. The elastic layer 11 is provided on the heater layer 14. The surface of the transfer drum is heated by the heater layer 14.

Figure 12:
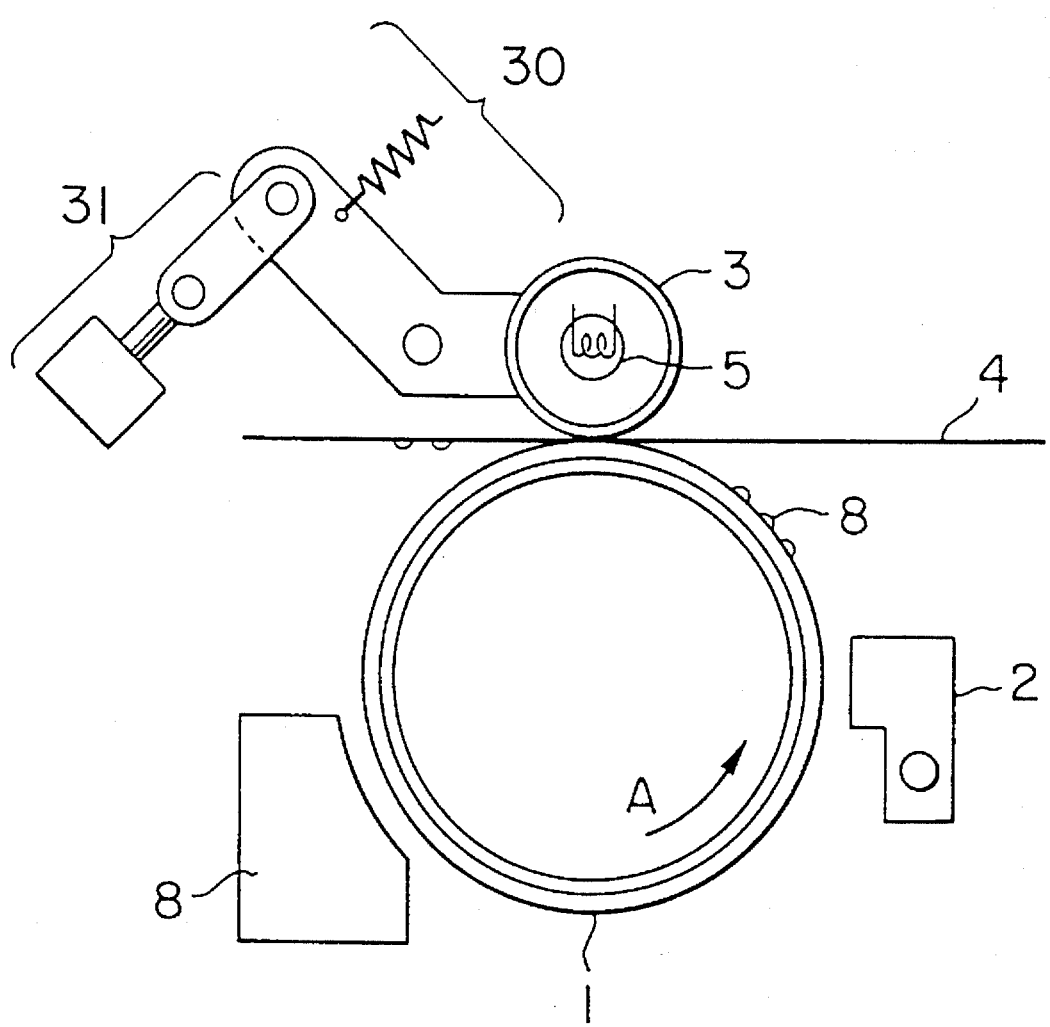
FIG. 12 is a diagram showing an ink jet recording device according to the present invention, which has a heater and a pressure roller integrally constructed.

According to a further preferred embodiment of the present invention, the heater 5 is constructed integrally with the pressure roller 3 as shown in FIG. 12. In this device, heating means 5 (for example, a heater) is provided inside the pressure roller 3. In this device, printing is effected as follows. The pressure roller 3 is first provided somewhat apart from the transfer drum 1 by the pressure release means 31. In this case, the transfer drum 1 is heated to a desired temperature by the heater 5 provided inside the pressure roller 3. The ink image 8 formed by the recording head 2 is heated and brought to a film form by the heater 5. Thereafter, the pressure roller 3 is pressed against the transfer drum 1 by the pressurizing means 30. At the same time, the recording medium 4 is carried to transfer the ink image to the recording medium. Alternatively, from the beginning, the pressure-roller 3 may be pressed against the transfer drum 1 to heat the transfer drum 1. In this case, a series of procedures comprising the formation of an ink image, the conversion of the ink image to a film form and the transfer of the ink image in a film form to the recording medium may be performed in a continuous manner. More interestingly, in the device shown in FIG. 12, it is possible to simultaneously bring the ink image to a film form and transfer the ink image to the recording medium by properly setting conditions, such as the temperature of the heater 5 and the number of revolutions of the transfer drum 1. Specifically, the ink image formed by the recording head 2 is heated while pressed between the pressure roller 3 and the transfer drum 1 against the recording medium 4 to bring the ink image to a film form and transfer the ink image to the recording drum.

Figure 13:
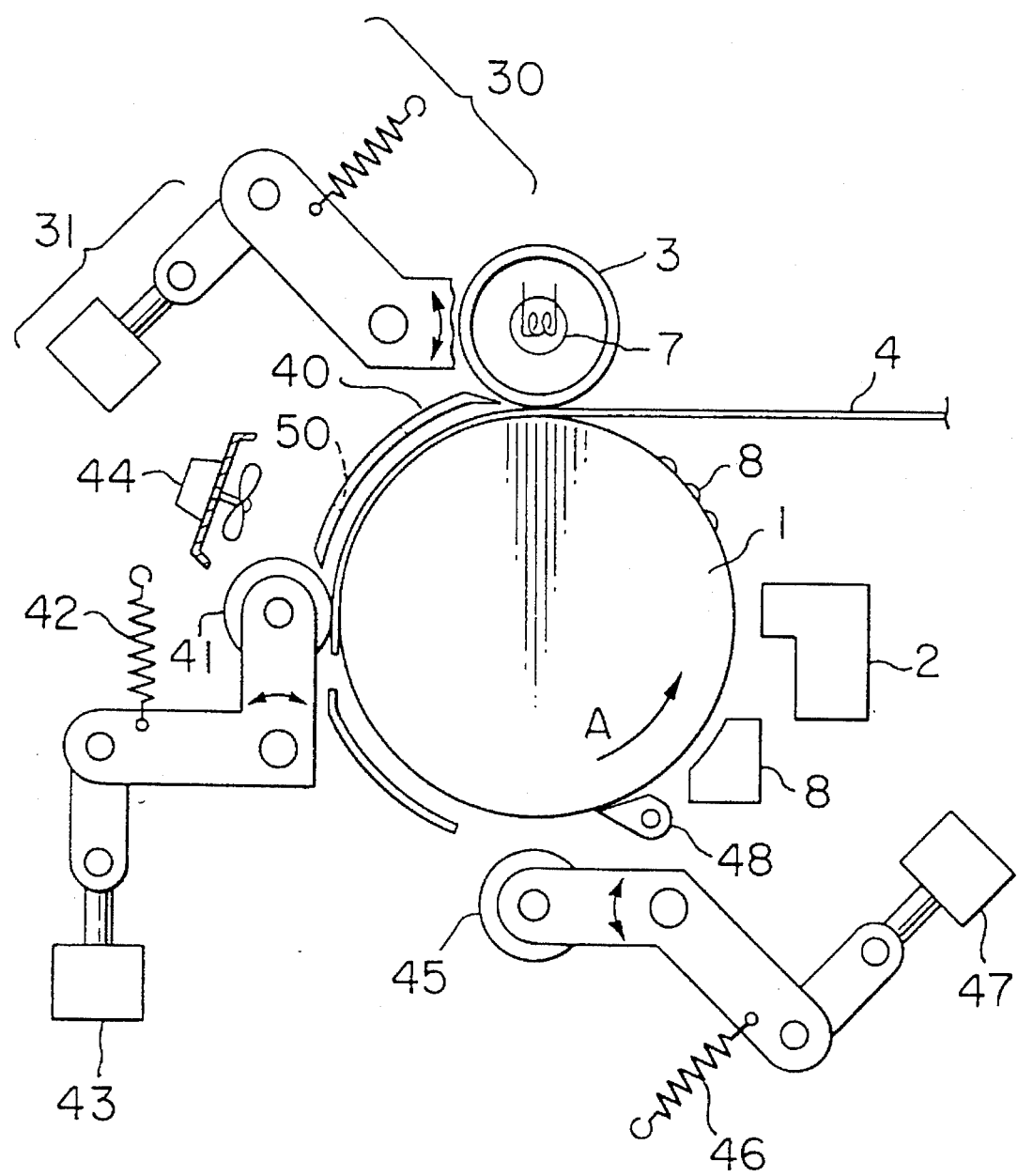
FIG. 13 is a diagram showing an ink jet recording device according to the present invention, wherein cooling means for cooling a recording medium having a transferred image is further provided on the device shown in FIG. 12.

According to a preferred embodiment of the present invention, there is provided a recording device as shown in FIG. 13. FIG. 14 is a partially perspective view of the device shown in FIG. 13. The device shown in FIG. 13 comprises the elements shown in FIG. 12 and further several elements. This device is provided with a carrier guide 40 and a carrier roller 41 that serve to carry the recording medium 4 also after pressing means of the pressure roller 3 with the recording medium in contact with or in close vicinity to the transfer drum 1. The carrier roller 41 is pressed by pressure applying means 42 and is separated from the transfer drum 1 by pressure release means 43. As shown in FIG. 13, the carrier guide 40 is provided with a notch window 50. Air is sent to the notch window 50 with a cooling fan 44 to cool the recording medium 6 from the reverse of the print face. This device is further provided with means for cooling the recording medium having a transferred ink image, that is a cooling roller 45. The cooling roller 45 may comprise a metal having a good heat conductivity or a hollow roller filled with a cooling medium. The cooling roller 45 can be also pressed by the pressure applying means 46 and aparted from the transfer drum 1 by the pressure release means 47. In this device, printing is effected as follows. Specifically, as described above with reference to FIG. 12, firstly, the ink image formed on the transfer drum 1 by the recording head 2 is heated between the pressure roller 3 and the transfer drum 1 while the ink image is pressed against the recording medium 4, so that the ink image is brought to a film form and simultaneously transferred to the recording medium 4. Thereafter, the recording medium 4 is carried with the rotation of the transfer drum 1. The recording medium 4 is carried in contact with or in close vicinity to the transfer drum 1 by the carrier guide 40 and the carrier roller 41. During the carrying, the recording medium 4 is cooled by air sent from the cooling fan 44. Furthermore, the recording medium 4 is cooled with a cooling roller 45 and finally separated from the transfer drum 1 by a peeling claw 48.

In the recording method A according to the present invention, the ink image on the transfer drum to the recording medium can be successfully transferred under a low pressure of about 12 kg/cm or less, preferably about 10 kg/cm. When an ink composition containing a saccharide according to the preferred embodiment of the present invention is employed, good transfer can be realized under a lower pressure than the above, specifically a pressure of about 10 kg/cm or less, preferably about 0.6 kg/cm or less. A pressure of 0.6 kg/cm or less is very advantageous from a reduction in size of the device and a reduction in cost of parts used.

The recording device B for the recording method B will now be described. As described above, some parts of the recording device B are the same as that of the recording device A. Specifically, in the recording device B, the transfer drum 1, the recording head 2, the pressure roller 3, the heating means 5 and the cleaner means 7 may be the same as those described above in connection with the recording device A. Therefore, also in the devices shown in FIGS. 5 and 6, these parts may be the same as those of the device shown in FIGS. 1 and 2. Furthermore, the embodiments shown in FIGS. 7 to 11 can be also utilized in the recording device B.

The recording device B of the present invention and the recording device A are different from each other in that the recording device B has heating means that can sufficiently concentrate the ink image on the transfer drum 1 with the thermoplastic resin remaining unsoftened or unmelted. Thereafter, the ink image which has been concentrated and brought to a film form by heating is then transferred to the recording medium 4.

A further difference between the recording device B of the present invention and the recording device A is that the recording device B has means for heating the ink image transferred to the recording medium 4 to at least the softening or melting temperature of the thermoplastic resin, i.e., post-heating means. When the softening or melting temperature is between 50° C. and 150° C., the post heating is effected in such a manner that the heating temperature is at least the softening or melting temperature of the thermoplastic resin and preferably in the range of from 50° to 200° C., still preferably in the range of from 50° to 180° C.

In the devices shown in FIGS. 5 and 6, the roller 9b and the roller 9c comprise, for example, a metal having a good heat conductivity. Furthermore, the heating element in the post-heating means may be constructed, for example, as shown in FIG. 15. Specifically, the recording medium 4 having a transferred image is heated in a non-contact system with radiant heat from heating means 5 comprising a heater 52 and a reflecting mirror 53.

The recording method B according to the present invention, the ink image can be successfully transferred from the transfer drum to the recording medium under a low pressure of about 15 kg/cm or less, preferably 10 kg/cm or less. Furthermore, when an ink composition containing a saccharide according to the preferred embodiment of the present invention is employed, good transfer can be realized under a lower pressure than that described above, specifically about 10 kg/cm or less, preferably about 0.6 kg/cm or less.

In the step of post-heating in the recording method B according to the present invention, it is preferred to apply pressure simultaneously with heating although this is not essential to the present invention. The pressure is specifically in the range of from about 0.3 to 1.5 kg/cm, preferably in the range of from about 0.3 to 0.8 kg/cm.

Ink Composition

According to the present invention, there is provided an ink composition used in the above recording methods. As described above, in the recording method A, an ink composition comprising water, a colorant, a thermoplastic resin is employed. In the recording method B, an ink composition comprising water, a colorant, a thermoplastic resin and a water-soluble organic solvent and, when the thermoplastic resin is a water-insoluble resin, further comprising a water-soluble polymer is employed.

(Colorant)

The colorant used in the ink composition according to the present invention may preferably have a good affinity for the solvent or can be homogeneously dispersed in a solvent when it is used in combination with a dispersant.

Preferred examples of the colorant include water-soluble dyes, disperse dyes, water-insoluble dyes (when knead with a thermoplastic resin) and pigments.

Examples of the water-soluble dyes include direct dyes, acidic dyes, basic dyes and food dyes. Specific preferred examples thereof include:

C.I. Direct Black 9, 17, 19, 22, 32, 51, 56, 62, 69, 77, 80, 91, 94, 97, 108, 112, 113, 114, 117, 118, 121, 122, 125, 132, 146, 154, 166, 168, 173 and 199, C.I. Direct Red 2, 4, 9, 23, 26, 31, 39, 62, 63, 72, 75, 76, 79, 80, 81, 83, 84, 89, 92, 95, 111, 173, 184, 207, 211, 212, 214, 218, 221, 223, 224, 225, 226, 227, 232, 233, 240, 241, 242, 243 and 247, C.I. Direct Violet 7, 9, 47, 48, 51, 66, 90, 93, 94, 95, 98, 100 and 101, C.I Direct Yellow 8, 9, 11, 12, 27, 28, 29, 33, 35, 39, 41, 44, 50, 53, 58, 59, 68, 86, 87, 93, 95, 96, 98, 100, 106, 108, 109, 110, 130, 132, 142, 144, 161 and 163, C.I. Direct Blue 1, 10, 15, 22, 25, 55, 67, 68, 71, 76, 77, 78, 80, 84, 86, 87, 90, 98, 106, 108, 109, 151, 156, 158, 159, 160, 168, 189, 192, 193, 194, 199, 200, 201, 202, 203, 207, 211, 213, 214, 218, 225, 229, 236, 237, 244, 248, 249, 251, 252, 264, 270, 280, 288, 289 and 291, C.I. Acid Black 7, 24, 29, 48, 52:1 and 172, C.I. Acid Red 35, 42, 52, 57, 62, 80, 82, 111, 114, 118, 119, 127, 128, 131, 143, 151, 154, 158, 249, 254, 7, 261, 263, 266, 289, 299, 301, 305, 336, 337, 361, 396 and 397, C.I. Acid Violet 5, 34, 43, 47, 48, 90, 103 and 126, C.I. Acid Yellow 17, 19, 23, 25, 39, 40, 42, 44, 49, 50, 61, 64, 76, 79, 110, 127, 135, 143, 151, 159, 169, 4,190, 195, 196, 197,199, 218, 219, 222 and 227, C.I. Acid Blue 9, 25, 40, 41, 62, 72, 76, 78, 80, 82, 92, 106, 112, 113, 120, 127:1, 129, 138, 143, 175, 181, 205, 207, 220, 221, 230, 232, 247, 258, 260, 264, 271, 277, 278, 279, 280, 288, 290 and 326, C.I. Reactive Black 4, 5, 8, 14, 21, 23, 26, 31, 32 and 34, C.I. Reactive Red 3, 13, 17, 19, 21, 22, 23, 24, 29, 35, 37, 40, 41, 43, 45, 49 and 55, C.I. Reactive Violet 1, 3, 4, 5, 6, 7, 8, 9, 16, 17, 22, 23, 24, 26, 27, 33 and 34, C.I. Reactive Yellow 2, 3, 13, 14, 15, 17, 18, 23, 24, 25, 26, 27, 29, 35, 37, 41 and 42, C.I. Reactive Blue 2, 3, 5, 8, 10, 13, 14, 15, 17, 18, 19, 21, 25, 26, 27, 28, 29 and 38, C.I. Basic Black 8, C.I. Basic Red 12, 13, 14, 15, 18, 22, 23, 24, 25, 27, 29, 35, 36, 38, 39, 45 and 46, C.I. Basic Violet 1, 2, 3, 7, 10, 15, 16, 20, 21, 25, 27, 28, 35, 37, 39, 40 and 48, C.I. Basic Yellow 1, 2, 4, 11, 13, 14, 15, 19, 21, 23, 24, 25, 28, 29, 32, 36, 39 and 40, C.I. Basic Blue 1, 3, 5, 7, 9, 22, 26, 41, 45, 46, 47, 54, 57, 60, 62, 65, 66, 69 and 71, and C.I. Food Black.

Specific preferred examples of the water-insoluble dye include:

C.I. Solvent Black 3, 5 and 22,

C.I. Solvent Yellow 19, 44, 98, 104, 105, 112, 113 and 114,

C.I. Solvent Red 8, 24, 71, 109, 152, 155, 176, 177 and 179,

C.I. Solvent Blue 2, 11, 25, 78, 94 and 95,

C.I. Solvent Green 26,

C.I. Solvent Orange 5, 40, 45, 72, 63, 68 and 78, and

C.I. Solvent Violet 13, 31, 32 and 33.

Preferred examples of the disperse dye include:

C.I. Disperse Yellow 3, 5, 56, 60, 64 and 160,

C.I. Disperse Red 4, 5, 60, 72, 73 and 91,

C.I. Disperse Blue 3, 7, 56, 60, 79 and 198, and

C.I. Disperse Orange 13 and 30.

The amount of these dyes added is determined depending upon, for example, kinds of dyes, kinds of solvent component and properties required to the ink. It is generally in the range of 0.2 to 10% by weight, preferably in the range of 0.5 to 5% by weight.

The pigment usable as the colorant include organic pigments and inorganic pigments. Preferred specific examples of pigments for a black ink include carbon black (C.I. Pigment Black 7), such as furnace black, lamp black, acetylene black and channel black, metals, such as copper, iron (C.I. Pigment Black 11) and titanium oxide, and organic pigments, such as aniline black (C.I. Pigment Black 1). Preferred specific examples of the pigment for a color ink include:

C.I. Pigment Yellow 1 (fast yellow G), 3 and 12 (disazo yellow AAA), 13, 14, 17, 24, 34, 35, 37 and 42 (iron oxide yellow), 53, 55, 81 and 83 (disazo yellow HR), 95, 97, 98, 100, 101, 104, 108, 109, 110, 117, 120, 138 and 153, C.I. Pigment Orange 5, 13, 16, 17, 36, 43 and 51, C.I. Pigment Red 1, 2, 3, 5, 17 and 22 (brilliant fast scarlet), 23, 31, 38 and 48:2 (permanent red 2B (Ba)), 48:2 (permanent red 2B (Ca)), 48:3 (permanent red 2B (Sr), 48:4 (permanent red 2B (Mn)), 49:1, 52:2, 53:1 and 57:1 (brilliant carmine 6B), 60:1, 63:1, 63:2, 64:1 and 81 (rhodamine 6G lake), 83, 88 and 101 (iron oxide red), 104, 105, 106 and 108 (cadmium red), 112, 114 and 122 (quinacridone magenta), 123, 146, 149,166, 168, 170, 172, 177, 178, 179, 185, 190, 193, 209 and 219, C.I. Pigment Violet 1 (rhodamine lake), 3, 5:1, 16 and 19 (quinacridone red), 23 and 38, C.I. Pigment Blue 1, 2 and 15 (phthalocyanine blue R), 15:1, 15:2 and 15:3 (phthalocyanine blue G), 15:4 and 15:6 (phthalocyanine blue E), 16 and 17:127 (iron blue), 28 (cobalt blue), 29 (ultramarine blue), 56, 60 and 63, and C.I. Pigment Green 1, 4, 7, 8, 10, 17, 18 and 36. It is also possible to use, besides the above pigments, processed pigments, such as graft carbon having a surface treated with a resin or the like.

The amount of addition of the pigment is preferably about 1 to 30% by weight. The particle diameter of the pigment is preferably 25 μm or less, particularly preferably 1 μm or less.

If necessary, the addition of a dispersant in an amount of 1 to 100% by weight based on the pigment followed by a dispersion treatment with a ball mill or the like may be carried out for the purpose of homogeneously dispersing the pigment.

(Thermoplastic Resin)

The thermoplastic resin used in the ink composition according to the present invention has a softening or hot-melt temperature of 50° to 150° C., preferably 60° to 100° C. The term "softening or melting temperature" used herein is intended to mean the lowest temperature in the glass transition point, melting point, temperature necessary for providing a coefficient of viscosity of $10^{11}$ to $10^{12}$ poises and fluid point.

The softening or melting point of the thermoplastic resin is under 50° C. may bring unfavorable phenomena, for example, when the ink is allowed to stand in an environment around 50° C., deterioration in the ink, such as gelation of the ink, and clogging due to the formation of a resin film during drying within the ink jet head. On the other hand, when the melting temperature exceeds 150° C., the energy efficiency becomes poor. Furthermore, a material having heat resistance should be used, which gives rise to problems such as an increase in cost of the device.

The amount of the thermoplastic resin used is preferably up to about 30% by weight based on the ink. These resins are preferably able to form a solid or a fragile solid matter without becoming a film form upon drying at room temperature and, on the other hand, to form a strong and water-resistant film upon heating at the softening or melting temperature or more followed by cooling.

Specific examples of the water-insoluble thermoplastic resin include, but not limited to, polyacrylic acid, polymethacrylic acid, polymethacrylic esters, polyethylacrylic acid, styrene/butadiene copolymer, butadiene copolymers, acrylonitrile/butadiene copolymer, chloroprene copolymer, crosslinked acrylic resin, crosslinked styrene resin, fluororesin, fluorinated vinylidene, benzoguanamine resin, phenolic resin, polyolefin resin, cellulose resin, styrene/acrylic acid copolymer, styrene/methacrylic acid copolymer, polystyrene, styrene/acrylamide copolymer, n-isobutyl acrylate, acrylonitrile, vinyl acetate, acrylamide, silicone resin, polyvinylacetal, polyamide, rosin resin, polyethylene, polycarbonate, vinylidene chloride resin, cellulosic resin, epoxy resin, vinyl acetate resin, ethylene/vinyl acetate copolymer, vinyl acetate/acrylic copolymer, vinyl chloride resin, polyurethane and rosin esters.

Specific examples of low-molecular weight thermoplastic resin include polyethylene wax, montan wax, alcohol wax, synthesized oxidized wax, α-olefin/maleic anhydride copolymer, animal and vegetable waxes, such as carnauba wax, lanolin, paraffin wax and microcrystalline wax.

These water-insoluble resins are added preferably in a form wherein the resin alone is dispersed as fine particles, or an emulsion particle form wherein the resin is stably dispersed in water (hereinafter often referred to as "resin emulsion"). The resin emulsion added to the ink according to the present invention is intended to mean an emulsion comprising water as a continuous phase and the above resin component as a disperse phase.

According to a preferred embodiment of the present invention, the resin constituting the resin emulsion is preferably a polymer having a combination of a hydrophilic portion with a hydrophilic portion. Although the particle diameter of the resin component is not particularly limited so far as the resin forms an emulsion, it is preferably about 150 nm or less, still preferably about 5 to 100 nm.

The resin emulsion can be prepared by mixing resin particles optionally together with a surfactant in water. For example, an emulsion of an acrylic resin or a styrene-acrylic resin can be prepared by mixing a (meth)acrylic ester or styrene and a (meth)acrylic ester, optionally together with (meth)acrylic acid, and a surfactant into water. The surfactant is not particularly limited. Preferred examples thereof include anionic surfactants. They may be used alone or in the form of a mixture of two or more of them.

Known resin emulsions may be used as the resin emulsion. For example, resin emulsions described in, for example, Japanese Patent Publication No. 1426/1987, Japanese Patent Laid-Open Nos. 56573/1991, 79678/1991, 160068/1991 and 18462/1992, may be used.

Commercially available emulsions can also be utilized. Examples thereof include Microgel E-1002 and E-5002 (a styrene-acrylic resin emulsion manufactured by Nippon Paint Co., Ltd.), Voncoat 4001 (an acrylic resin emulsion manufactured by Dainippon Ink and Chemicals, Inc.), Voncoat 5454 (a styrene-acrylic resin emulsion manufactured by Dainippon ink and Chemicals, Inc.), SAE1014 (a styrene-acrylic resin emulsion manufactured by Nippon Zeon Co., Ltd.) and Saivinol SK-200 (an acrylic resin emulsion manufactured by Saiden Chemical Industry Co., Ltd.).

In the ink composition according to the present invention, a water-soluble thermoplastic resin may be employed. Preferred examples thereof include polyethylene oxide, glue, gelatin, casein, albumin, gum arabic, alginic acid, methyl cellulose, carboxymethyl cellulose, hydroxyethyl cellulose and polyvinyl ether.

In the ink composition according to the present invention, it is also possible to use particles of a colored resin comprising a thermoplastic resin integrated with a colorant. The colored resin particles may be prepared by mixing the thermoplastic resin with the colorant by means of, e.g. a mixer, kneading the mixture by means of, e.g. a three-roll mill and granulating the kneaded product. The diameter of the colored resin particles is preferably 10 µm or less, particularly preferably 5 µm or less, from the viewpoint of preventing clogging of the recording head.

Commercially available colored resin particles may also be used, and examples thereof include colored Microgel (manufactured by Nippon Paint Co., Ltd.) and toners for electrophotography.

(Water-Soluble Polymers)

The ink composition used in the recording method B may further comprise a water-soluble polymer, when the thermoplastic resin is a water-insoluble resin.

In the recording method B, the water-soluble polymer serves to bind the solid component in the agglomerate which is formed by evaporating the solvent from the ink and also serves to render the surface of the agglomerate viscose.

Preferred examples of the water-soluble polymer used in the present invention include polyalkyl oxides, such as polyethylene oxide, polyvinyl pyrrolidone, polyvinyl alcohol, polyvinyl butyral, polyacrylic acid, glue, gelatin, casein, albumin, gum arabic, alginic acid, methyl cellulose, carboxymethyl cellulose, hydroxyethyl cellulose, polyvinyl ether, starch, polyethylene glycol and polyvinyl methyl ether.

The amount of the water-soluble polymer added is preferably in the range of from about 1 to 30% by weight, still preferably in the range of from 1 to 20% by weight.

When the thermoplastic resin is soluble in water, since it serves to as a water-soluble polymer, the addition of a further water-soluble polymer is not indispensable. However, the addition thereof is preferred.

(Saccharides)

Examples of the saccharide used in the present invention include monosaccharides, disaccharides, trisaccharides, tetrasaccharides, polysaccharides and their derivatives, such as reduction derivatives, oxidation derivatives, dehydration derivatives, amino acids, thiosaccharides and other saccharides.

Specific examples of the saccharide include glucose, diose, maltose, triose, tetrose, pentose, hexose, heptose, octose, nonose, sucrose, inositol, xylose, maltotriose, galactose, sugar alcohol, deoxy sugar, aldonic acid, uronic acid, glycoseen and α-cyclodextrin. The polysaccharide means saccharides in a broad sense and includes also naturally widely occurring substances such as dextrin and starch.

These saccharides are used in the ink in such an amount that the content ratio of the saccharide to the thermoplastic resin is in the range of from 1:4 to 4:1.

(Solvent)

Water is used as the solvent in the ink composition according to the present invention. Water is particularly preferably pure water or ultrapure water subjected to purification processes such as ion exchange or distillation. Use of water as the solvent leads to advantages including low viscosity, excellent safety, no fear of adverse effect on human body, easiness to handle, low cost and odorless.

The ink composition according to the present invention further comprises a water-soluble organic solvent as the solvent. The addition of the water-soluble organic solvent can improve the moisture retention of the ink to prevent clogging and further improve the stability of the ink. Furthermore, the water-soluble organic solvent promotes the formation of the peeling layer. Without intending to be bound by theory, it is believed that the mechanism through which the "peeling layer" is formed is as follows. When the solid component (that is, composed mainly of a colorant and a resin component) contained in the ink composition has a high hydrophobicity, the solid component and the water-soluble organic solvent are compatible with each other so far as water is present. When water becomes absent, since the solid component is highly hydrophobic with the water-soluble organic solvent being hydrophilic, the two components become uncompatible with each other, which leads to a phase separation. Therefore, in the recording methods A and B according to the present invention, when the ink image is heated to form an agglomerate of the solid component, the water-soluble organic solvent is phase-separated from the solid component and bleeds out on the agglomerate, especially between the intermediate transfer medium and the agglomerate. The layer thus formed is considered to be a peeling layer. Accordingly, in order to efficiently form the peeling layer a combination of a solid component organic having a high hydrophobicity and a water-soluble solvent having a high hydrophilicity and a high boiling point (that is, less liable to evaporate) may be advantageous.

Preferred examples of the water-soluble organic solvent include nitrogen-containing organic solvents, such as polyhydric alcohols having a high boiling point and a low volatility, such as glycerin, ethylene glycol, diethylene glycol, triethylene glycol, propylene glycol, dipropylene glycol, hexylene glycol, polyethylene glycol and polypropylene glycol. Further examples of the water-soluble organic solvent include monoetherification products, dietherification products and esterification products of the above-described polyhydric alcohols, such as ethylene glycol monomethyl ether, ethylene glycol monoethyl ether, ethylene glycol monobutyl ether, diethylene glycol monomethyl ether, diethylene glycol monoethyl ether and diethylene glycol monobutyl ether. Further preferred examples of the water-soluble organic solvent include N-methyl-2-pyrrolidone, 1,3-dimethylimidazolidinone, monoethanolamine, N,N-dimethylethanolamine, N,N-diethylethanolamine, diethanolamine, N,N-butyldiethanolamine, triisopropanolamine and triethanolamine. Further, when the main solvent is water, the addition of high volatile monohydric alcohols, such as ethanol, propanol, isopropanol and butanol, and relatively low volatile alcohols, such as hexanol, butanol and octanol, is preferred from the viewpoint of improving the quick drying property of the ink and the fixability. These water-soluble organic solvents may be used alone or in any combination of two or more of them.

The amount of these water-soluble organic solvents added is preferably in the range of from about 2 to 30% by weight, still preferably in the range of from 3 to 15% by weight, based on the ink.

(Additives)

The ink composition of the present invention may further contain various additives.

For example, it is preferred to add at least one water-soluble anionic, cationic, amphoteric or nonionic surfactant to the ink composition of the present invention. The addition of the surfactant lowers the surface tension of the ink. In this connection, when the surface of the intermediate transfer medium comprises, for example, a rubber material having a low surface tension, the surfactant improves the wettability of the rubber material by the ink to prevent the occurrence of repelling and flow of the ink on the transfer medium, thus enabling the ink image to be fixed.

Preferred specific examples of the anionic surfactant include a salt of a higher fatty acid, a salt of a higher alkyldicarboxylic acid, a salt of a higher alcohol sulfuric acid ester, a salt of a higher alkylsulfonic acid, a salt of an alkylbenzenesulfonic acid, a salt of an alkylnaphthalenesulfonic acid, a formalin condensate of a salt (Na, K, Li or Ca) of naphthalenesulfonic acid, a condensate of a higher fatty acid with an amino acid, a salt of an ester of a dialkylsulfosuccinic acid, a salt of an alkylsulfosuccinic acid, a salt of naphthalenic acid, a salt of an alkyl ether caboxylic acid, an acylated peptide, a salt of an α-olefin-sulfonic acid, N-acylated methyltaurine, a salt of an alkylethersulfuric acid, a secondary higher alcohol ethoxysulfate, a salt of a polyoxyethylene alkylphenyl ether sulfonic acid, a monoglysulfate, a salt of an alkyl ether phosphoric acid ester and a salt of an alkylphosphoric acid ester.

Specific preferred examples of the cationic surfactant include a fatty acid amine salt, a quaternary ammonium salt, a sulfonium salt and a phosphonium salt.

Specific preferred examples of the amphoteric surfactant include a carboxybetaine type surfactant, a salt of aminocarboxylic acid and lecithin.

Specific preferred examples of the nonionic surfactant include a fluorine surfactant, a silicone surfactant, a copolymer of acrylic acid, polyoxyethylene alkyl ether, polyoxyethylene alkylphenyl ether, polyoxyethylene secondary alcohol ether, polyoxyethylene sterol ether, a lanolin derivative of polyoxyethylene, an ethylene oxide derivative of a formalin condensate of an alkylphenol, a polyoxyethylene/polyoxypropylene block polymer, a fatty acid ester of a polyoxyethylene polyoxypropylene alkyl ether polyoxyethylene compound, a polyethylene oxide condensation type polyethylene glycol fatty acid ester, a fatty acid monoglyceride, a polyglycerin fatty acid ester, a sorbitan fatty acid ester, a propylene glycol fatty acid ester, a sucrose fatty acid ester, a fatty acid alkanolamide, a polyoxyethylene fatty acid amide and a polyoxyethylene alkylamine oxide.

The amount of addition of these surfactants is preferably about 0.01 to 10% by weight, still preferably about 0.1 to 5% by weight, based on the ink.

In the ink composition of the present invention, if necessary, pH adjustors, such as potassium dihydrogenphosphate and disodium hydrogenphosphate, benzoic acid, dichlorophene, hexachlorophene, sorbic acid, a p-hydroxybenzoic acid ester, ethylenediaminetetraacetic acid (EDTA), sodium dehydroacetate, 1,2-benzothiazolin-3-one, 3,4-isothiazolin-3-one may be added as a fungicide, a preservative and a rust preventive. Furthermore, urea, thiourea, ethyleneurea may be added for the purpose of preventing the nozzle from drying.

The viscosity of the ink composition of the present invention is preferably 50 mPa-sec or less, particularly preferably 25 mPa-sec or less, from the viewpoint of ensuring stable ejection of the ink from the nozzle and stable supply of the ink to the head.

(Production of Ink Composition)

The ink composition of the present invention can be produced, for example, by the following method. Specifically, a colorant, thermoplastic particles and optionally a dispersant (a surfactant), or thermoplastic colored resin particles and optionally a dispersant (a surfactant) are added to water, and they are mixed while stirring for 30 min or more in a paint shaker or a ball mill until particles in the resultant dispersion are confirmed under a microscope to be in a monodisperse state. A water-soluble polymer, a water-soluble organic solvent, a surfactant are added thereto, and mixing is further effected while stirring for additional 30 min or more to provide a completely homogeneous mixture. Thereafter, additives, such as preservatives, are added and completely dissolved therein. The mixture is filtered with a filter having a pore diameter of 20 to 5 μm to remove foreign particles and coarse particles, thereby providing an ink composition.

EXAMPLES

Examples of the ink composition according to the present invention will now be described in detail, though the present invention is not limited to these Examples only.

In the following Examples, recording device (1) represents a device shown in FIG. 1, and recording device (2) represents a device shown in FIG. 5.

The composition ratio is % by weight unless otherwise noted.

EXAMPLE 1

| Components | Composition ratio |
| --- | --- |
| Ion-exchanged water | 89.2 |
| Colorant (carbon black manufactured by Degussa) | 3.0 |
| Thermoplastic resin (PEO-1 manufactured by Sumitomo Chemical Engineering Co., Ltd., softening temp. = 65° C.) | 2.0 |
| Dispersant (anionic surfactant) | 0.8 |
| Water-soluble organic solvent | 5.0 |
| (glycerin) | |
| Total | 100 |

An ink composition was produced as follows. The colorant and the dispersant were added to the solvent and mixed together and stirred in a paint shaker for 1 hr until particles in the resultant dispersion were confirmed under a microscope to be in a monodisperse state. Thereafter, the thermoplastic resin was added thereto, and mixing was further effected for additional 1 hr to provide a homogeneous dispersion. The dispersion was filtered with a filter having a pore diameter of 10 μm to provide an ink composition.

When the ink composition was heated at 100° C. on a transfer drum of the recording device (1), the ink was able to be brought to a film form.

Comparative Example 1

The ink composition of Example 1 was put on the transfer drum of the recording device (1) at room temperature (25° C.) but not brought to a film form.

EXAMPLE 2

| Components | Composition ratio |
| --- | --- |
| Ion-exchanged water | 67.9 |
| Colored resin particles (colorant: carbon black; thermoplastic resin: styrene/acrylic copolymer) | 20 |
| Dispersant (nonionic surfactant) | 0.1 |

| Components | Composition ratio |
| --- | --- |
| Water-soluble organic solvent (glycerin) | 7 |
| Water-soluble organic solvent (ethanol) | 5 |
| Total | 100 |

The colored resin particles were prepared by kneading carbon black with a styrene/acrylic copolymer and granulating the kneaded product and had an average particle diameter of 3.5 µm, a specific gravity of 1.1 and a softening temperature of 86° C.

An ink was produced according to the following procedure. The colored resin particles and the dispersant were stirred and mixed together in water by means of a paint shaker for 30 min or more until particles in the resultant dispersion were confirmed under a microscope to be in a monodisperse state. After glycerin was added thereto, the mixture was stirred for additional 30 min for complete dissolution. The dispersion was filtered with a membrane filter having a pore diameter of 20 µm to remove foreign particles and coarse particles. After ethanol was added to the filtrate, they were mixed together for 5 min to provide a recording ink.

EXAMPLE 3

| Components | Composition ratio |
| --- | --- |
| Ion-exchanged water | 72.9 |
| Colored resin particles (colored microgel) (colorant: anthraquinone black oil dye, thermoplastic resin: PMMA) | 15 |
| Dispersant (nonionic surfactant) | 0.1 |
| Water-soluble organic solvent (glycerin) | 7 |
| Water-soluble organic solvent (ethanol) | 5 |
| Total | 100 |

The colored resin particles comprised a colored microgel comprising an internally three-dimensional crosslinked microgel and, incorporated thereinto, a black oil dye and had an average particle diameter of 0.1 µm, a specific gravity of 1.1 and a softening temperature of 96° C.

The ink was prepared in a similar manner as that of Example 2.

EXAMPLE 4

| Components | Composition ratio |
| --- | --- |
| Ion-exchanged water | 67.9 |
| Colored resin particles (colorant: nonaqueous dye C.I. Solvent Violet 32; thermoplastic resin: Polystyrene) | 20 |
| Dispersant (nonionic surfactant) | 0.1 |
| Water-soluble organic solvent (glycerin) | 7 |
| Water-soluble organic solvent (ethanol) | 5 |
| Total | 100 |

The colored resin particles were prepared by kneading C.I. Solvent Violet 32 as an aqueous dye with polystyrene as a thermoplastic resin and granulating the kneaded product and had an average particle diameter of 8.5 µm, a specific gravity of 1.2 and a softening temperature of 73° C.

The ink was prepared in a similar manner as that of Example 2.

EXAMPLE 5

| Component | Composition ratio |
| --- | --- |
| Distilled water | 72.5 |
| Colorant (organic pigment: phthalocyanine blue) | 10 |
| Thermoplastic resin particles (polymethacrylic acid) | 5 |
| Dispersant (fluorosurfactant) | 0.5 |
| Water-soluble organic solvent (polyethylene glycol) | 7 |
| Water-soluble organic solvent (propanol) | 5 |
| Total | 100 |

The thermoplastic resin particles had an average particle diameter of 0.05 µm, a specific gravity of 1.19 and a softening temperature of 100° C.

An ink was produced according to the following procedure. The colorant, the thermoplastic resin particles and the dispersant were mixed together with stirring in water by means of a paint shaker for 1 hr or more until particles in the resultant dispersion were confirmed under a microscope to be in a monodisperse state. After polyethylene glycol was added thereto, the mixture was further stirred for additional 30 min for complete dissolution. The dispersion was filtered with a membrane filter having a pore diameter of 5 µm to remove foreign particles and coarse particles. After propanol was added to the filtrate, they were mixed together for 5 min to provide a recording ink.

EXAMPLE 6

| Component | Composition ratio |
| --- | --- |
| Distilled water | 80.5 |
| Colorant (water-soluble dye: C.I. Acid Blue 9) | 2 |
| Thermoplastic resin particles (PMMA) | 5 |
| Dispersant (nonionic surfactant) | 0.5 |
| Water-soluble organic solvent (ethylene glycol) | 7 |
| Water-soluble organic solvent (ethanol) | 5 |
| Total | 100 |

The thermoplastic resin particles had an average particle diameter of 0.15 µm, a specific gravity of 1.1 and a softening temperature of 115° C.

The ink was prepared in a similar manner as that of Example 5.

EXAMPLE 7

| Component | Composition ratio |
| --- | --- |
| Distilled water | 69.9 |
| Colorant | 10 |
| (organic pigment: brilliant carmine 6B) | |
| Thermoplastic water-soluble resin | 8 |
| (polyethylene oxide) | |
| Dispersant (anionic surfactant) | 0.1 |
| Water-soluble organic solvent | 7 |
| (triethylene glycol) | |
| Water-soluble organic solvent | 5 |
| (ethanol) | |
| Total | 100 |

The thermoplastic resin particles comprised a water-soluble resin and had a softening temperature of 65° C.

An ink was prepared according to the following procedure. The water-soluble thermoplastic resin was mixed in water and stirred with a paint shaker for 1 hr or more (optionally while heating) until the resin was completely dissolved in water. After the colorant and the dispersant were added thereto, they were mixed together and stirred for additional 1 hr until particles in the resultant dispersion were confirmed under a microscope to be in a monodisperse state. After triethylene glycol was added thereto, the mixture was further stirred for additional 30 min to completely dissolve triethylene glycol. The dispersion was filtered with a membrane filter having a pore diameter of 5 µm to remove foreign particles and coarse particles. After ethanol was added thereto, they were mixed together for 5 min to provide the above recording ink.

EXAMPLE 8

| Component | Composition ratio |
| --- | --- |
| Distilled water | 80.4 |
| Colorant | 1.5 |
| (water-soluble dye: C.I. Acid Red 52) | |
| Thermoplastic water-soluble resin | 6 |
| (polyvinyl ether) | |
| Dispersant (cationic surfactant) | 0.1 |
| Water-soluble organic solvent | 7 |
| (propylene glycol) | |
| Water-soluble organic solvent | 5 |
| (ethanol) | |
| Total | 100 |

The thermoplastic resin particles comprised a water-soluble resin and had a softening temperature of 55° C.

The ink was prepared in a similar manner as that of Example 7.

EXAMPLE 9

| Component | Composition ratio |
| --- | --- |
| Distilled water | 77.9 |
| Colorant | 6 |
| (organic pigment: fast yellow G) | |
| Thermoplastic resin emulsion | 6 |
| (polyacrylic acid) | |
| Dispersant (nonionic surfactant) | 0.1 |
| Water-soluble organic solvent | 7 |
| (water-soluble silicone oil) | |
| Water-soluble organic solvent | 3 |
| (isopropanol) | |
| Total | 100 |

The thermoplastic resin emulsion had a softening temperature of 93° C. and an average particle diameter of 0.15 µm. This emulsion was able to be present at room temperature or above. In addition, at room temperature, while the emulsion dried, it is not able to be brought a "film form" but brought to soft or fragile.

An ink was prepared according to the following procedure. The colorant, the dispersant and the thermoplastic resin emulsion were mixed together and stirred in water by means of a paint shaker for 1 hr (optionally while heating). Therefore, it was confirmed that the resin was completely dissolved. After the colorant and the dispersant were added thereto, they were mixed together and stirred for additional 1 hr. The colorant was confirmed under a microscope to be in a homogeneously dispersed state. After water-soluble silicone oil was added thereto, they were further mixed together and stirred for additional 30 min to completely dissolve the silicone oil. The dispersion was filtered with a membrane filter having a pore diameter of 5 µm to remove foreign particles and coarse particles. After iso-propanol was added thereto, and they were mixed together for 5 min to provide the above recording ink.

EXAMPLE 10

| Component | Composition ratio |
| --- | --- |
| Distilled water | 80.9 |
| Colorant | 2.5 |
| (water-soluble dye: Acid Yellow 23) | |
| Thermoplastic resin emulsion | 4 |
| (carnauba wax) | |
| Dispersant (nonionic surfactant) | 0.1 |
| Water-soluble organic solvent | 6.5 |
| (glycerin) | |
| Water-soluble organic solvent | 6 |
| (ethanol) | |
| Total | 100 |

The thermoplastic resin emulsion had a softening temperature of 68° C. and an average particle diameter of 0.1 µm. As the emulsion of Example 9, at room temperature, while the emulsion dried, it is not able to be brought a "film form" but brought to soft or fragile.

The ink was prepared in a similar manner as that of Example 9.

Comparative Example 2

| Component | Composition ratio |
| --- | --- |
| Distilled water | 80.5 |
| Colorant (carbon black) | 7 |
| Dispersant (nonionic dispersant) | 0.5 |
| Water-soluble organic solvent | 7 |
| (polyethylene glycol) | |

| Component | Composition ratio |
| --- | --- |
| Water-soluble organic solvent | 5 |
| (ethanol) | |
| Total | 100 |

The ink composition of this comparative example did not contain any thermoplastic resin component. The ink was prepared in a similar manner as that of Example 5.

Comparative Example 3

| Component | Composition ratio |
| --- | --- |
| Distilled water | 75.5 |
| Colorant (carbon black) | 7 |
| Nonthermoplastic resin particles (polyurethane particles) | 7 |
| Dispersant (nonionic dispersant) | 0.5 |
| Water-soluble organic solvent (polyethylene glycol) | 5 |
| Water-soluble organic solvent | 5 |
| (ethanol) | |
| Total | 100 |

The ink composition of this comparative example contained a resin component not having a thermoplasticity (a thermosetting resin). The ink was prepared in a similar manner as that of Example 5.

Comparative Example 4

| Component | Composition ratio |
| --- | --- |
| Distilled water | 80.9 |
| Colorant (water-soluble dye: C.I. Direct Black 154) | 2.5 |
| Thermoplastic resin emulsion (low-molecular weight polyethylene; hot-melt temperature = 45° C.) | 4 |
| Dispersant (nonionic surfactant) | 0.1 |
| Water-soluble organic solvent (glycerin) | 6.5 |
| Water-soluble organic solvent | 6 |
| (ethanol) | |
| Total | 100 |

The ink composition of this comparative example contained a thermoplastic resin having a melting temperature below 50° C. The ink was prepared in a similar manner as that of Example 5.

EXAMPLE 11

| Component | Composition ratio |
| --- | --- |
| Ion-exchanged water | 72.9 |
| Colored resin particles (colorant: carbon black; thermoplastic resin: styrene/acrylic copolymer) | 20 |
| Dispersant (anionic surfactant) | 0.1 |

| Component | Composition ratio |
| --- | --- |
| Water-soluble organic solvent | 7 |
| (glycerin) | |
| Total | 100 |

The colored resin particles were prepared by kneading carbon black with a styrene/acrylic copolymer and granulating the kneaded product and had an average particle diameter of 3.5 µm, a specific gravity of 1.1 and a softening temperature of 86° C.

An ink was produced according to the following procedure. The colored resin particles and the dispersant were stirred and mixed together in water by means of a paint shaker for 30 min or more until particles in the resultant dispersion were confirmed under a microscope to be in a monodisperse state. After glycerin was added thereto, and mixing with stirring was effected for additional 30 min for complete dissolution. The dispersion was filtered with a membrane filter having a pore diameter of 20 µm to remove foreign particles and coarse particles to provide a recording ink.

EXAMPLE 12

| Component | Composition ratio |
| --- | --- |
| Ion-exchanged water | 78.9 |
| Colored resin particles (Microgel manufactured by Nippon Paint Co., Ltd.) (colorant: anthraquinone black oil dye; thermoplastic resin: n-Butyl methacrylate) | 15 |
| Dispersant (nonionic surfactant) | 0.1 |
| Water-soluble organic solvent (glycerin) | 1 |
| Water-soluble organic solvent | 5 |
| (ethanol) | |
| Total | 100 |

The colored resin particles comprised a colored microgel comprising an internally three-dimensional crosslinked microgel and, incorporated thereinto, a black oil dye and had an average particle diameter of 0.1 µm, a specific gravity of 1.1 and a softening temperature of 73° C.

An ink was produced according to the following procedure. The colored resin particles and the dispersant were stirred and mixed together in water by means of a paint shaker for 1 hr or more until the colored resin particles were confirmed under a microscope to be in a monodisperse state. After glycerin was added thereto, the mixture was stirred for additional 30 min for complete dissolution. The dispersion was filtered with a membrane filter having a pore diameter of 5 µm to remove foreign particles and coarse particles. After propanol was added to the filtrate, they were mixed together for 5 min to provide a recording ink.

EXAMPLE 13

| Component | Composition ratio |
| --- | --- |
| Distilled water | 64.9 |
| Colorant (nonaqueous dye C.I. Solvent Violet 32; | 20 |

| Component | Composition ratio |
|---|---|
| thermoplastic resin: polystyrene) | |
| Dispersant (fluorosurfactant) | 0.1 |
| Water-soluble organic solvent (ethylene glycol) | 10 |
| Water-soluble organic solvent (propanol) | 5 |
| Total | 100 |

The colored resin particles had an average particle diameter of 0.05 μm, a specific gravity of 1.19 and a softening temperature of 73° C. The ink was prepared in a similar manner as that of Example 12.

EXAMPLE 14

| Component | Composition ratio |
|---|---|
| Distilled water | 54.5 |
| Colored resin particles (colorant: carbon black; thermoplastic resin: PMMA) | 25 |
| Dispersant (fluorosurfactant) | 0.5 |
| Water-soluble organic solvent (polyethylene glycol) | 15 |
| Water-soluble organic solvent (ethanol) | 5 |
| Total | 100 |

The colored resin particles had an average particle diameter of 0.05 μm, a specific gravity of 1.19 and a softening temperature of 100° C. The ink was prepared in a similar manner as that of Example 12.

EXAMPLE 15

| Component | Composition ratio |
|---|---|
| Distilled water | 42 |
| Colored resin particles (colorant: brilliant carmine 6B; thermoplastic resin: polyethylene oxide) | 30 |
| Dispersant (anionic surfactant) | 3 |
| Water-soluble organic solvent (propylene glycol) | 20 |
| Water-soluble organic solvent (ethanol) | 5 |
| Total | 100 |

The thermoplastic resin particles had an average particle diameter of 0.15 μm, a specific gravity of 1.1 and a softening temperature of 120° C. The ink was prepared in a similar manner as that of Example 12.

EXAMPLE 16

| Component | Composition ratio |
|---|---|
| Distilled water | 61 |
| Colored resin particles (colorant: carbon black; thermoplastic resin: styrene/acrylic copolymer) | 20 |
| Dispersant (anionic surfactant) | 3 |

| Component | Composition ratio |
|---|---|
| Water-soluble organic solvent (glycerin) | 10 |
| Water-soluble organic solvent (ethanol) | 6 |
| Total | 100 |

The thermoplastic resin particles comprised a toner for electrophotography having an average particle diameter of 9 μm, a specific gravity of 1.7 and a softening temperature of 120° C. The ink was prepared in a similar manner as that of Example 11.

EXAMPLE 17

| Component | Composition ratio |
|---|---|
| Distilled water | 62 |
| Colored resin particles (colorant: carbon black; thermoplastic resin: fumaric acid/etherified diphenolic polyester) | 20 |
| Dispersant (anionic surfactant) | 3 |
| Water-soluble organic solvent (glycerin) | 10 |
| Water-soluble organic solvent (ethanol) | 5 |
| Total | 100 |

The thermoplastic resin particles comprised a toner for electrophotography having an average particle diameter of 7 μm, a specific gravity of 1.6 and a softening temperature of 110° C. The ink was prepared in a similar manner as that of Example 11.

Comparative Example 5

| Component | Composition ratio |
|---|---|
| Distilled water | 80.9 |
| Colorant (carbon black) | 7 |
| Dispersant (nonionic dispersant) | 0.1 |
| Water-soluble organic solvent (polyethylene glycol) | 7 |
| Water-soluble organic solvent (ethanol) | 5 |
| Total | 100 |

The ink composition of this comparative example did not contain any thermoplastic resin component.

An ink was produced according to the following procedure. The colorant, the thermoplastic resin particles and the dispersant were mixed together with stirring in water by means of a paint shaker for 1 hr or more until particles in the resultant dispersion were confirmed under a microscope to be in a monodisperse state. After polyethylene glycol was added thereto, the mixture was further stirred for additional 30 min for complete dissolution. The dispersion was filtered with a membrane filter having a pore diameter of 5 μm to remove foreign particles and coarse particles. After ethanol was added to the filtrate, they were mixed together for 5 min to provide a recording ink.

Comparative Example 6

| Component | Composition ratio |
| --- | --- |
| Distilled water | 74.9 |
| Colored resin particles | 15 |
| (colorant: water-soluble dye: | |
| C.I. Direct Black 154 | |
| thermoplastic resin emulsion: | |
| low-molecular weight polyethylene; | |
| hot-melt temperature = 35° C.) | |
| Dispersant (nonionic surfactant) | 0.1 |
| Water-soluble organic solvent | 5 |
| (glycerin) | |
| Water-soluble organic solvent | 5 |
| (ethanol) | |
| Total | 100 |

The ink composition of this comparative example contained a thermoplastic resin component having a melting temperature below 50° C. The ink was prepared in a similar manner as that of Comparative Example 5.

Comparative Example 7

| Component | Composition ratio |
| --- | --- |
| Distilled water | 74.3 |
| Colored resin particles | 15 |
| (colorant: water-soluble dye: | |
| C.I. Direct Black 154 | |
| thermoplastic resin emulsion: | |
| high-molecular weight polyester; | |
| hot-melt temperature = 165° C.) | |
| Dispersant (nonionic surfactant) | 0.3 |
| Water-soluble organic solvent | 5 |
| (glycerin) | |
| Water-soluble organic solvent | 5 |
| (ethanol) | |
| Total | 100 |

The ink composition of this comparative example contained a thermoplastic resin component having a heat-softening temperature above 150° C. The ink was prepared in a similar manner as that of Comparative Example 5.

Comparative Example 8

| Component | Composition ratio |
| --- | --- |
| Ion-exchanged water | 79.7 |
| Colored resin particles | 20 |
| (colorant: carbon black; | |
| thermoplastic resin: | |
| styrene/acrylic copolymer) | |
| Dispersant (anionic surfactant) | 0.3 |
| Water-soluble organic solvent | None |
| (glycerin), | |
| Total | 100 |

The ink composition of this comparative example did not contain any water-soluble organic solvent. The procedure of Example 11 was repeated to prepare an ink, except that only the step of adding the water-soluble organic solvent was omitted.

EXAMPLE 18

| Component | Composition ratio |
| --- | --- |
| Ion-exchanged water | 72 |
| Colored resin particles | 20 |
| (colorant: carbon black) | |
| (thermoplastic resin: | |
| styrene/acrylic copolymer) | |
| Dispersant | 1 |
| (silicone surfactant: | |
| Silwet L-7604 manufactured by | |
| Nippon Unicar Co., Ltd.) | |
| Water-soluble organic solvent | 7 |
| (glycerin) | |
| Total | 100 |

The colored resin particles were prepared by kneading carbon black with a styrene/acrylic copolymer and granulating the kneaded product and had an average particle diameter of 3.5 µm, a specific gravity of 1.1 and a softening temperature of 86° C.

An ink was produced according to the following procedure. The colored resin particles and the dispersant were stirred and mixed together in water by means of a paint shaker for 30 min or more until particles in the resultant dispersion were confirmed under a microscope to in a monodisperse state. After glycerin was added thereto, the mixture was stirred for additional 30 min for complete dissolution. The dispersion was filtered with a membrane filter having a pore diameter of 20 µm to remove foreign particles and coarse particles to provide an ink.

EXAMPLE 19

| Component | Composition ratio |
| --- | --- |
| Ion-exchanged water | 75 |
| Colored resin particles | 15 |
| (colored microgel manufactured | |
| by Nippon Paint Co., Ltd.) | |
| (colorant: anthraquinone | |
| black oil dye) | |
| (thermoplastic resin: | |
| n-Butyl methacrylate) | |
| Dispersant | 1 |
| (anionic surfactant: | |
| trade name: AEROSOL OT-100; | |
| manufactured by Mitsui-Cyanamid, Ltd.) | |
| Water-soluble organic solvent | 9 |
| (triethylene glycol) | |
| Total | 100 |

The colored resin particles comprised a colored microgel comprising an internally three-dimensional crosslinked microgel and, incorporated thereinto, a black oil dye and had an average particle diameter of 0.1 µm, a specific gravity of 1.1 and a softening temperature of 50° C.

EXAMPLE 20

| Component | Composition ratio |
| --- | --- |
| Ion-exchanged water | 64 |
| Colored resin particles | 20 |
| (colorant: carbon black) | |
| (thermoplastic resin: fumaric | |
| acid/etherified diphenolic polyester) | |

-continued

| Component | Composition ratio |
|---|---|
| Dispersant. (fluorosurfactant: trade name: FC-170C manufactured by Sumitomo 3M Ltd.) | 1 |
| Water-soluble organic solvent (polyethylene glycol) | 5 |
| (glycerin) | 5 |
| (ethanol) | 5 |
| Total | 100 |

The thermoplastic resin particles comprised a toner for electrophotography having an average particle diameter of 7 µm, a specific gravity of 1.6 and a softening temperature of 110° C. They can be used in the ink for ink jet recording. The ink was prepared in a similar manner as that of Example 18.

Comparative Example 9

| Component | Composition ratio |
|---|---|
| Ion-exchanged water | 79 |
| Colored resin particles (colorant: carbon black) (thermoplastic resin: Styrene/acrylic copolymer) | 20 |
| Dispersant (silicone surfactant: trade name: Silwet L-7604 manufactured by Nippon Unicar Co., Ltd.) | 1 |
| Total | 100 |

The ink composition of this comparative example did not contain any water-soluble organic solvent. The thermoplastic resin is the same toner for electrophotography as that used in Example 20 and can be used in the ink for ink jet recording according to the present invention. The ink was prepared in a similar manner as that of Example 18.

EXAMPLE 21

| Component | Composition ratio |
|---|---|
| Colorant (20% water dispersion of carbon black) | 15 |
| Thermoplastic resin (Styrene/acrylic copolymer: Microgel; resin emulsion manufactured by Nippon Paint Co., Ltd.) | 3 |
| Water-soluble polymer (polyvinyl pyrrolidone) | 1.5 |
| Surfactant (fluorosurfactant: Fluorad FC-170C; perfluoroalkylpolyoxyethylene ethanol manufactured by Sumitomo 3M Ltd.) | 1 |
| Surfactant (sodium dioctylsulfosuccinate) | 1 |
| Water-soluble organic solvent (glycerin) | 5 |
| Ion-exchanged water | 73.5 |
| Total | 100 |

An ink was prepared according to the following procedure. After a water dispersion of the colorant and the dispersant were mixed and confirmed under a microscope to be in a monodisperse state, the water-soluble polymer, the thermoplastic resin, the surfactant and glycerin were added thereto. They were mixed together and stirred for 30 min to provide a completely homogeneous mixture. Thereafter, additives, such as a preservative, were added and completely dissolved therein. The dispersion was filtered with a membrane filter having a pore diameter of 10 µm to remove foreign particles and coarse particles to provide a recording ink.

The thermoplastic resin had an internal three-dimensional crosslinking and a particle diameter of 0.2 µm and a softening point of 65° C. The 20% water dispersion of carbon black was prepared by dissolving a dispersant (sodium dioctylsulfosuccinate) in a ratio of the dispersant to the pigment (MA-100 manufactured by Mitsubishi Kasei Corp.) of 0.1 in pure water, adding the pigment in the solution, and dispersing the pigment in an average particle diameter of 0.5 µm by means of a ball mill.

EXAMPLE 22

| Component | Composition ratio |
|---|---|
| Colorant (20% water dispersion of carbon black: prepared as described in Example 30) | 15 |
| Thermoplastic resin (polyacrylic ester: Primal manufactured by Japan Acrylic Chemical Co., Ltd.) | 5 |
| Water-soluble polymer (carboxymethyl cellulose) | 5 |
| Surfactant (fluorosurfactant: Fluorad FC-430; fluoroalkyl ester manufactured by Sumitomo 3M Ltd.) | 2 |
| Water-soluble organic solvent (dipropylene glycol) | 7 |
| Sodium dehydroacetate | 0.1 |
| Ion-exchanged water | 65.9 |
| Total | 100 |

The ink was prepared in a similar manner as that of Example 21. The thermoplastic resin had a softening point of 86° C.

EXAMPLE 23

| Component | Composition ratio |
|---|---|
| Colorant + thermoplastic resin (toner for electrophotography containing carbon black and styrene/acrylic copolymer) | 10 |
| Water-soluble polymer (polyvinyl alcohol) | 5 |
| Surfactant (silicone surfactant: Silwet L-7604 manufactured by Nippon Unicar Co., Ltd.) | 1 |
| Surfactant (fluorosurfactant: Fluorad FC-170; fluoroalkyl ester manufactured by Sumitomo 3M Ltd.) | 1 |
| Water-soluble organic solvent (ethylene glycol) | 5 |
| Water-soluble organic solvent | 5 |

| Component | Composition ratio |
|---|---|
| (ethanol) | |
| Ethylenediaminetetraacetic acid (EDTA) | 0.1 |
| Ion-exchanged water | 72.9 |
| Total | 100 |

An ink was prepared according to the following procedure. The toner, the surfactant and ethylene glycol were mixed together in a ball mill or a paint shaker until the toner was confirmed under a microscope to be in a monodisperse state. After the water-soluble polymer and ethanol were added thereto, the mixture was further stirred for additional 30 min to provide a completely homogeneous mixture. Thereafter, additives, such as a preservative, were added and completely dissolved therein. The dispersion was then filtered with a membrane filter having a pore diameter of 20 μm to remove foreign particles and coarse particles to provide a recording ink.

The toner used had a particle diameter of 7 μm and a softening temperature of 90° C.

EXAMPLE 24

| Component | Composition ratio |
|---|---|
| Colorant (20% water dispersion of carbon black: prepared as described in Example 21) | 15 |
| Thermoplastic water-soluble resin (polyethylene oxide) | 5 |
| Surfactant (fluorosurfactant: Fluorad FC-170C; perfluoroalkylpolyoxyethylene ethanol manufactured by Sumitomo 3M Ltd.) | 3 |
| Surfactant (sodium dioctylsulfosuccinate) | 3 |
| Water-soluble organic solvent (polyethylene glycol #200) | 5 |
| Ion-exchanged water | 69 |
| Total | 100 |

The procedure of Example 21 was repeated to prepare an ink. The above resin had a combination of the properties of the thermoplastic resin with the effect of the water-soluble polymer and a softening temperature of 60° C.

EXAMPLE 25

An ink was prepared in a similar manner as that of Example 21, except that phthalocyanine blue as a color organic pigment was used.

EXAMPLE 26

| Component | Composition ratio |
|---|---|
| Colorant (water-soluble dye: C.I. Direct Black 9) | 1.5 |
| Thermoplastic resin (ethylene/vinyl acetate copolymer: resin emulsion manufactured | 5 |
| by Denki Kagaku Kogyo K.K.) | |
| Water-soluble polymer (water-soluble acrylic resin: Primal P-6N manufactured by Japan Acrylic Chemical Co., Ltd. | 5 |
| Surfactant (nonionic surfactant: Sorgen TW-60 polyoxyethylene sorbitan monostearate manufactured by Dai-ichi Kogyo Seiyaku Co., Ltd.) | 1 |
| Water-soluble organic solvent (triethanolamine) | 5 |
| Water-soluble organic solvent (Propanol) | 5 |
| Sodium dehydroacetate | 0.1 |
| Ion-exchanged water | 77.4 |
| Total | 100 |

An ink was prepared according to the following procedure. The water-soluble dye, the surfactant, diethylene glycol and the ion-exchanged water were mixed together in a paint shaker until the dye was confirmed under a microscope to be in a monodisperse state. After the thermoplastic resin, the water-soluble polymer, the surfactant and propanol were added thereto, the mixture was further stirred for additional 30 min to provide a completely homogeneous mixture. Thereafter, additives, such as a preservative, were added and completely dissolved therein. The dispersion was then filtered with a membrane filter having a pore diameter of 50 μm to remove foreign particles and coarse particles to provide a recording ink. The thermoplastic resin had a softening temperature of 82° C.

Comparative Example 10

The ink was prepared in a similar manner as that of Example 21, except that the thermoplastic resin was not added.

Comparative Example 11

The ink was prepared in a similar manner as that of Example 21, except that the water-soluble polymer was not added.

Comparative Example 12

The ink was prepared in a similar manner as that of Example 21, except that the thermoplastic resin (a styrene/acrylic copolymer) used had a softening point of 36° C.

Comparative Example 13

The ink was prepared in a similar manner as that of Example 30, except that the thermoplastic resin (a styrene/acrylic copolymer) used had a softening point of 180° C.

EXAMPLE 27

| Component | Composition ratio |
|---|---|
| Colorant + thermoplastic resin (toner for electrophotography containing carbon black and styrene/acrylic copolymer) | 10 |
| Water-soluble polymer | 5 |

-continued

| Component | Composition ratio |
|---|---|
| (polyvinyl alcohol: trade name: Denka Poval manufactured by Denki Kagaku Kogyo K.K., molecular weight: about 40,000) | |
| Surfactant (silicone surfactant: trade name: Silwet L-7604 manufactured by Nippon Unicar Co., Ltd.) | 1 |
| Surfactant (fluorosurfactant: trade name: Fluorad FC-170; fluoroalkyl ester manufactured by Sumitomo 3M Ltd.) | 1 |
| Water-soluble organic solvent (ethylene glycol) | 5 |
| Water-soluble organic solvent (ethanol) | 5 |
| Ethylenediaminetetraacetic acid (EDTA) | 0.1 |
| Ion-exchanged water | 72.9 |
| Total | 100 |

An ink was prepared according to the following procedure. The toner, the surfactant and ethylene glycol were mixed together in a ball mill or a paint shaker until the toner was confirmed under a microscope to be in a monodisperse state. After the water-soluble polymer and ethanol were added thereto, the mixture was further stirred for additional 30 min to provide a completely homogeneous mixture. Thereafter, additives, such as a preservative, were added and completely dissolved therein. The dispersion was then filtered with a membrane filter having a pore diameter of 20 μm to remove foreign particles and coarse particles to provide a recording ink.

The toner used had a particle diameter of 7 μm and a softening temperature of 90° C.

EXAMPLE 28

| Component | Composition ratio |
|---|---|
| Colorant + thermoplastic resin (toner for electrophotography containing carbon black and styrene/acrylic copolymer) | 10 |
| Water-soluble polymer (polyvinyl pyrrolidone: manufactured by Tokyo Chemical Industry Co., Ltd., molecular weight: about 40,000) | 5 |
| Surfactant (silicone surfactant: trade name: Silwet L-7604 manufactured by Nippon Unicar Co., Ltd.) | 1 |
| Surfactant (fluorosurfactant: trade name: Fluorad FC-170; fluoroalkyl ester manufactured by Sumitomo 3M Ltd.) | 1 |
| Water-soluble organic solvent (ethylene glycol) | 5 |
| Water-soluble organic solvent (ethanol) | 5 |
| Ethylenediaminetetraacetic acid (EDTA) | 0.1 |
| Ion-exchanged water | 72.9 |
| Total | 100 |

The ink was prepared in a similar manner as that of Example 27.

The toner used had a particle diameter of 3 μm and a softening temperature of 65° C.

EXAMPLE 29

| Component | Composition ratio |
|---|---|
| Colorant + thermoplastic resin (toner: toner for electrophotography) | 10 |
| Water-soluble polymer (water-soluble acrylic resin: trade name: Primal manufactured by Japan Acrylic Chemical Co., Ltd.) | 5 |
| Surfactant. (silicone surfactant: trade name: Silwet L-7604 manufactured by Nippon Unicar Co., Ltd.) | 1 |
| Surfactant (fluorosurfactant: trade name: Fluorad FC-170; fluoroalkyl ester manufactured by Sumitomo 3M Ltd.) | 1 |
| Water-soluble organic solvent (ethylene glycol) | 5 |
| Water-soluble organic solvent (ethanol) | 5 |
| Ethylenediaminetetraacetic acid (EDTA) | 0.1 |
| Ion-exchanged water | 72.9 |
| Total | 100 |

The ink was prepared in a similar manner as that of Example 27.

The toner used had a particle diameter of 2.5 μm and a softening temperature of 90° C.

EXAMPLE 30

| Component | Composition ratio |
|---|---|
| Colorant (carbon black: MA-100 manufactured by Mitsubishi Kasei Corp.) | 2 |
| Thermoplastic resin (styrene-n-Butyl methacrylate copolymer: Himer SBM-73 manufactured by Sanyo Chemical Industry Co., Ltd.) | 8 |
| Water-soluble polymer (polyvinyl alcohol: trade name: Denka Poval manufactured by Denki Kagaku Kogyo K.K., molecular weight: about 40,000) | 5 |
| Surfactant (silicone surfactant: trade name: Silwet L-7604 manufactured by Nippon Unicar Co., Ltd.) | 1 |
| Surfactant (fluorosurfactant: trade name: Fluorad FC-170; fluoroalkyl ester manufactured by Sumitomo 3M Ltd.) | 1 |
| Water-soluble organic solvent (ethylene glycol) | 5 |
| Water-soluble organic solvent (ethanol) | 5 |

| Component | Composition ratio |
| --- | --- |
| Ethylenediaminetetraacetic acid (EDTA) | 0.1 |
| Ion-exchanged water | 72.9 |
| Total | 100 |

An ink was prepared according to the following procedure. The carbon black and the thermoplastic resin were mixed together by means of a mixer, kneaded at 90° C. or below by means of a three-roll mill, cooled and subjected to coarse crushing to provide coarse particles of a colored resin. The coarse particles, water, the surfactant and ethylene glycol were mixed together by means of a ball mill to disperse the colored resin particles. After the particles were confirmed under a microscope to be in a fine monodisperse state, the water-soluble polymer and ethanol were added thereto. The mixture was further stirred for additional 30 min to provide a completely homogeneous mixture. Thereafter, additives, such as a preservative, were added and completely dissolved therein. The dispersion was then filtered with a membrane filter having a pore diameter of 20 μm to remove foreign particles and coarse particles to provide a recording ink.

The toner used had a particle diameter of 5 μm and a softening temperature of 65° C.

Comparative Example 14

The composition was the same as that of Example 27, except that the thermoplastic resin was not added.

| Component | Composition ratio |
| --- | --- |
| Colorant (20% water dispersion of carbon black) | 15 |
| Water-soluble polymer (polyvinyl alcohol: trade name: Denka Poval manufactured by Denki Kagaku Kogyo K.K., molecular weight: about 40,000) | 5 |
| Surfactant (sodium dioctylsulfosuccinate) | 1 |
| Surfactant (fluorosurfactant: trade name: Fluorad FC-170; fluoroalkyl ester manufactured by Sumitomo 3M Ltd.) | 1 |
| Water-soluble organic solvent (ethylene glycol) | 5 |
| Water-soluble organic solvent (ethanol) | 5 |
| Ethylenediaminetetraacetic acid (EDTA) | 0.1 |
| Ion-exchanged water | 67.9 |
| Total | 100 |

An ink was prepared according to the following procedure. After a water dispersion comprising the colorant and the dispersant was confirmed under a microscope to be in a monodisperse state, the water-soluble polymer, surfactant and ethylene glycol were added thereto. The mixture was further stirred for additional 30 min to provide a completely homogeneous mixture. Thereafter, additives, such as a preservative, were added and completely dissolved therein. The dispersion was then filtered with a membrane filter having a pore diameter of 10 μm to remove foreign particles and coarse particles to provide a recording ink. The 20% water dispersion of carbon black was prepared by dissolving a dispersant (sodium dioctylsulfosuccinate) in a ratio of the dispersant to the pigment (MA-100 manufactured by Mitsubishi Kasei Corp.) of 0.1 in pure water, adding the pigment in the solution, and dispersing the pigment in an average particle diameter of 0.5 μm by means of a ball mill.

The average particle diameter of the carbon black was 0.5 μm.

Comparative Example 15

The ink was prepared in a similar manner as that of Example 27, except that the water-soluble polymer was not added.

EXAMPLE 31

| Component | Composition ratio |
| --- | --- |
| Colorant (20 wt. % water dispersion of carbon black) | 15 |
| Thermoplastic resin (20 wt. % water dispersion of ultrafine particles microgel of polymer having three-dimensional structure: manufactured by Nippon Paint Co., Ltd., softening temp. = 65° C.; particle diameter: 0.50 μm) | 15 |
| Water-soluble polymer (polyvinyl alcohol: Denka Poval manufactured by Denki Kagaku Kogyo K.K.) | 1.5 |
| Surfactant (silicone surfactant: Silwet L-7604 manufactured by Nippon Unicar Co., Ltd.) | 1 |
| Water-soluble organic solvent (dipropylene glycol) | 5 |
| Ion-exchanged water | 62.5 |
| Total | 100 |

An ink was prepared according to the following procedure.

After a water dispersion comprising the colorant and the dispersant was confirmed under a microscope to be in a monodisperse state, the surfactant, dipropylene glycol, the water-soluble polymer and the water dispersion of ultrafine particles of a polymer having a there-dimensional crosslinked structure were added thereto. The mixture was further stirred for additional 30 min to provide a completely homogeneous mixture. Thereafter, additives, such as a preservative, were added and completely dissolved therein. The dispersion was then filtered with a membrane filter having a pore diameter of 10 μm to remove foreign particles and coarse particles to provide a recording ink. The 20% water dispersion of carbon black was prepared by dissolving a dispersant (sodium dioctylsulfosuccinate) in a ratio of the dispersant to the pigment (#1000 manufactured by Mitsubishi Kasei Corp.) of 0.1 in pure water, adding the pigment in the solution and dispersing the pigment in an average particle diameter of 0.5 μm by means of a ball mill.

EXAMPLE 32

| Component | Composition ratio |
|---|---|
| Colorant<br>(20 wt. % water dispersion of carbon black: prepared as described in Example 31) | 15 |
| Thermoplastic resin<br>(20 wt. % water dispersion of ultrafine particles microgel of polymer having three-dimensional structure: manufactured by Nippon Paint Co., Ltd., softening temp. = 90° C.; particle diameter: 0.07 μm) | 15 |
| Water-soluble polymer<br>(polyvinyl alcohol: Denka Poval manufactured by Denka Kagaku Kogyo K.K.) | 1.5 |
| Surfactant<br>(silicone surfactant: Silwet L-7604 manufactured by Nippon Unicar Co., Ltd.) | 1 |
| Water-soluble organic solvent<br>(dipropylene glycol) | 5 |
| Ion-exchanged water | 62.5 |
| Total | 100 |

The ink was prepared in a similar manner as that of Example 31.

EXAMPLE 33

| Component | Composition ratio |
|---|---|
| Colorant<br>(20 wt. % water dispersion of carbon black: prepared as described in Example 31) | 15 |
| Thermoplastic resin<br>(20 wt. % water dispersion of ultrafine particles microgel of polymer having three-dimensional structure: manufactured by Nippon Paint Co., Ltd., softening temp. = 110° C.; particle diameter: 0.85 μm) | 15 |
| Water-soluble polymer<br>(polyvinyl alcohol: Denka Poval manufactured by Denka Kagaku Kogyo K.K.) | 1.5 |
| Surfactant<br>(silicone surfactant: Silwet L-7604 manufactured by Nippon Unicar Co., Ltd.) | 1 |
| Water-soluble organic solvent<br>(dipropylene glycol) | 5 |
| Ion-exchanged water | 62.5 |
| Total | 100 |

The ink was prepared in a similar manner as that of Example 31.

EXAMPLE 34

| Component | Composition ratio |
|---|---|
| Colorant<br>(20 wt. % water dispersion of carbon black: prepared as described in Example 31) | 15 |
| Thermoplastic resin<br>(20 wt. % water dispersion of ultrafine particles microgel of polymer having three-dimensional structure: manufactured by Nippon Paint Co., Ltd., softening temp. = 65° C.; particle diameter: 0.50 μm) | 40 |
| Water-soluble polymer<br>(polyvinyl alcohol: Denka Poval manufactured by Denka Kagaku Kogyo K.K.) | 1.5 |
| Surfactant<br>(silicone surfactant: Silwet L-7604 manufactured by Nippon Unicar Co., Ltd.) | 1 |
| Water-soluble organic solvent<br>(dipropylene glycol) | 5 |
| Ion-exchanged water | 37.5 |
| Total | 100 |

The ink was prepared in a similar manner as that of Example 31.

EXAMPLE 35

| Component | Composition ratio |
|---|---|
| Colorant<br>(20 wt. % water dispersion of carbon black: prepared as described in Example 40) | 15 |
| Thermoplastic resin<br>(20 wt. % water dispersion of ultrafine particles microgel of polymer having three-dimensional structure: manufactured by Nippon Paint Co., Ltd., softening temp. = 65° C.; particle diameter: 0.50 μm) | 15 |
| Water-soluble polymer<br>(Polyvinyl pyrrolidone: manufactured by Tokyo Chemical Industry Co., Ltd.) | 1.5 |
| Water-soluble polymer<br>(polyvinyl alcohol: Denka Poval manufactured by Denka Kagaku Kogyo K.K.) | 1 |
| Surfactant<br>(silicone surfactant: Silwet L-7604 manufactured by Nippon Unicar Co., Ltd.) | 1 |
| Water-soluble organic solvent<br>(dipropylene glycol) | 5 |
| Ion-exchanged water | 61.5 |
| Total | 100 |

The ink was prepared in a similar manner as that of Example 31.

EXAMPLE 36

| Component | Composition ratio |
|---|---|
| Colorant<br>(20 wt. % water dispersion of carbon black: prepared as described in Example 31) | 15 |
| Thermoplastic resin<br>(20 wt. % water dispersion of ultrafine particles microgel of polymer having three-dimensional structure: manufactured by Nippon Paint Co., Ltd., softening temp. = 65° C.; particle diameter: 0.50 μm) | 15 |
| Water-soluble polymer<br>(Polyvinyl pyrrolidone: manufactured by Tokyo Chemical Industry Co., Ltd.) | 2.5 |
| Surfactant<br>(silicone surfactant: Silwet L-7604 manufactured by Nippon Unicar Co., Ltd.) | 1 |
| Water-soluble organic solvent<br>(dipropylene glycol) | 5 |
| Ion-exchanged water | 61.5 |
| Total | 100 |

The ink was prepared in a similar manner as that of Example 31.

Comparative Example 16

The ink was prepared in a similar manner as that of Example 31, except that the thermoplastic resin was not added.

Comparative Example 17

The ink was prepared in a similar manner as that of Example 31, except that the water-soluble resin was not added.

Comparative Example 18

The ink was prepared in a similar manner as that of Example 31, except that the thermoplastic resin used was a microgel having a three-dimensional crosslinked structure and had a softening temperature of 36° C.

Comparative Example 19

The ink was prepared in a similar manner as that of Example 31, except that the thermoplastic resin used was a microgel having a three-dimensional crosslinked structure and had a softening temperature of 180° C.

EXAMPLE 37

| Component | Composition ratio |
|---|---|
| Colorant (15% water dispersion of carbon black: pigment: MA-100 manufactured by Mitsubishi Kasei Corp.) | 20.0 |
| Thermoplastic resin (styrene/acrylic copolymer: Microgel: resin emulsion manufactured by Nippon Paint Co., Ltd.) | 10.0 |
| Sugar (α-cyclodextrin) | 10.0 |
| Water-soluble organic solvent (dipropylene glycol) | 9.0 |
| Preservative (Ethylenediaminetetraacetic acid) | 0.01 |
| Ion-exchanged water | 50.99 |
| Total | 100 |

The 15% water dispersion of carbon black as the colorant was prepared by dissolving a dispersant (sodium dioctylsulfosuccinate) in a ratio of the dispersant to the pigment of 0.1 in pure water, adding the pigment in the solution and dispersing the pigment in an average particle diameter of 0.5 μm by means of a ball mill.

An ink was prepared according to the following procedure. The colorant and the dispersant were dispersed in the solvent. After the dispersoid was confirmed under a microscope to be in a monodisperse state, the saccharide, the thermoplastic resin and dipropylene glycol were added thereto. The mixture was further stirred for additional 30 min to provide a completely homogeneous mixture. Thereafter, additives, such as a preservative, were added and completely dissolved therein. The dispersion was then filtered with a membrane filter having a pore diameter of 10 μm to remove foreign particles and coarse particles to provide a recording ink.

The thermoplastic resin used herein had an internally three-dimensional crosslinked structure, a particle diameter of about 0.2 μm and a softening temperature of 65° C.

EXAMPLE 38

| Component | Composition ratio |
|---|---|
| Colorant (15% water dispersion of carbon black: prepared as described in Example 37) | 20.0 |
| Thermoplastic resin (Superflex: crosslinked urethane elastomer resin emulsion manufactured by Dai-Ichi Kogyo Seiyaku Co., Ltd.) | 10.0 |
| Sugar (sucrose) | 10.0 |
| Water-soluble organic solvent (diethylene glycol) | 9.0 |
| Surfactant (fluorosurfactant: Fluorad FC-170C; fluoroalkyl ester manufactured by Sumitomo 3M Ltd.) | 1.0 |
| Ion-exchanged water | 50.0 |
| Total | 100 |

The ink was prepared in a similar manner as that of Example 37. The thermoplastic resin used had a particle diameter of about 0.5 μm and a softening point of 80° C.

EXAMPLE 39

| Component | Composition ratio |
|---|---|
| Colorant (15% water dispersion of carbon black: prepared as described in Example 37) | 20.0 |
| Thermoplastic resin (Primal manufactured by Japan Acrylic Chemical Co., Ltd.) | 10.0 |
| Sugar (starch) | 10.0 |
| Water-soluble organic solvent (diethylene glycol) | 4.5 |
| Water-soluble organic solvent (ethyl alcohol) | 4.5 |
| Surfactant (fluorosurfactant: Fluorad FC-170C; fluoroalkyl ester manufactured by Sumitomo 3M Ltd.) | 3.0 |
| Surfactant (hydrocarbon surfactant: Noigen EA-170: polyoxyethylene alcohol phenyl ether manufactured by Dai-ichi Kogyo Seiyaku Co., Ltd.) | 3.0 |
| Ion-exchanged water | 45.0 |
| Total | 100 |

The ink was prepared in a similar manner as that of Example 37. The thermoplastic resin used herein had a particle diameter of about 0.3 μm and a softening point of 73° C.

Printing Test

The inks of the examples of the present invention and the comparative examples were tested in (1) the ink jet recording device of the present invention or (2) the conventional intermediate transfer ink jet recording device (wherein an ink image is not heated on the transfer drum). The results are given below.

Evaluation items and criteria for the evaluation were as follows.

(1) Jetting stability

The nozzles were allowed to remain opened under an environment of 20° C. for a predetermined period of time. The jetting stability was then evaluated based on whether or not the ink could be jetted through all the nozzles.

Successful jetting of the ink through all the nozzles was observed after opening of the nozzles for 5 min . . . ○

Successful jetting of the ink through all the nozzles was observed after allowing the nozzles to remain opened for 1 to less than 5 min . . . Δ

Successful jetting of the ink through all the nozzles was not observed after allowing the nozzles to remain opened for 1 min . . . x (2) Clogging after standing for long period of time The nozzles were allowed to remain opened under an environment of 45° C. for a predetermined period of time. The clogging was then evaluated based on whether or not clogging occurred.

Clogging was not observed after allowing the nozzles to remain opened for 10 days . . . o Clogging was not observed after allowing the nozzles to remain opened for 5 days but observed after allowing the nozzles to remain opened for 10 days . . . Δ

Clogging was observed after allowing the nozzles to remain opened for 5 days . . . x (3) Print density The print density in terms of average OD value was measured with a microdensitometer (manufactured by Konica Corp.).

OD value of 1.4 or more . . . o
OD value of less than 1.4 to 1.2 or more . . . Δ
OD value of less than 1.2 . . . x (4) Sharpness of edge The state of the edge of the print was evaluated with the naked eye.

The edge was sharp independently of the print pattern . . . o

The edge was disturbed depending upon the print pattern . . . Δ

The whole edge was disturbed with blurred image . . . x (5) Adaptability to paper 100 kinds in total of paper including copying paper, bond paper and regenerated paper were printed. The number of kinds of paper, which provided a print having an OD value of 1.4 or more and had a sharp edge independently of the print pattern was regarded as the percentage adaptability to paper of the ink composition.

Percentage adaptability to paper of 97% or more . . . o

Percentage adaptability to paper of less than 97% to 90% . . . Δ

Percentage adaptability to paper of less than 90% . . . x (6) Rubbing resistance The print was allowed to stand for 10 min after printing, and then the surface of the print was rubbed with a finger. The rubbing resistance of the print was evaluated based on whether or not a stain occurred on the print face.

No stain was observed even when the print was rubbed strongly . . . o

A stain distinguishable with the naked eye occurred when the print was rubbed strongly . . . Δ

A stain distinguishable with the naked eye occurred even when the print was rubbed weakly . . . x (7) Water resistance The water resistance was evaluated as follows. When the print was brought to contact with water, the print was not blurred at all . . . o the print at its edge was blurred . . . Δ the print was washed away . . . x (8) Quick drying property

The quick drying property was evaluated based on the time necessary for causing no stain when a finger touched the print after printing.

Time necessary for causing no stain of the print was less than 15 sec . . . o

Time necessary for causing no stain of the print was sec to 1 min . . . Δ

A smudge occurred when a finger touched the print even 10 min after printing . . . x (9) Storage stability The storage stability was evaluated based on whether or not an agglomerate occurred when the ink composition was allowed to stand under an environment of 45° C.

No agglomerate occurred even when the ink composition was allowed to stand for one year . . . o An agglomerate occurred when the ink composition was allowed to stand for 6 months to one year . . . Δ

An agglomerate occurred when the ink composition was allowed to stand for one month . . . x

(10) Image untransferred

The ink image was transferred to a recording medium at a transfer pressure of 1.0 kg/cm. The weight of the ink on the transfer medium before and after transfer of the ink image to the recording medium. The percentage of image untransferred was determined by the following equation.

$$\text{Percentage of image untransferred} = \frac{\text{Weight of residual ink on transfer drum after transfer}}{\text{Weight of ink on transfer drum before transfer}} \times 100$$

Percentage of image untransferred of 0% . . . excellent (◎)

Percentage of image untransferred of 0 to less than 2% . . . good (o)

Percentage of image untransferred of 2% or more . . . poor (x)

(11) Dropout

The proportion of the number of missed dots relative to the number of necessary dots per unit area of the print was expressed in percentage.

0% . . . excellent (◎)

0 to less than 2% . . . good (o)

2% or more . . . poor (x)

(12) Unevenness of density

A solid print portion of the print was scanned with a microdensitometer (manufactured by Konia Corp.) to measure the difference between the maximum OD value and the minimum OD value.

Difference of 0.1 or less . . . excellent (◎)

Difference of 0.1 to less than 0.2 . . . good (o)

Difference of 0.2 or more . . . poor (x)

(13) State of peeling layer formed

The state of "peeling layer" formed between the transfer drum and the ink image was observed.

The peeling layer was satisfactorily formed . . . o

The peeling layer was formed but unsatisfactory . . . Δ

The peeling layer was not formed . . . x

(14) Transfer of image from transfer medium to recording medium

The transfer pressure necessary for realizing a percentage transfer of approximately 100% was measured. The pressure was measured by means of "Tacking Tester LT-25A-500" (manufactured by Resuka K.K.).

The pressure was: 3 kg/cm$^2$ or less . . . o more than 3.1 kg/cm$^2$ to 5 kg/cm$^2$ or less . . . Δ 5.1 kg/cm$^2$ or more . . . x

(15) Transfer pressure and percentage of image untransferred

The relationship between the transfer pressure and the percentage of image untransferred was examined under various printing conditions. The time taken for the ink image to be transferred from the transfer drum to the transfer medium was 10 sec at the printing initiation portion and 2 sec at the printing termination portion. The print was evaluated as follows.

Percentage of image untransferred of 0% with no change in image ... ⊙

Percentage of image untransferred of less than 5% with deformation of image ... Δ

Percentage of image untransferred of 5% or more with occurrence of dropout and deformation of image ... x The results were as given in the following tables.

TABLE 1

| Ink | Recording device | (10) Image untransferred | (11) Dropout | (12) Unevenness of density |
|---|---|---|---|---|
| Example 1 | Device | ⊙ | ⊙ | ⊙ |
| Example 1 | Conventional device | O | X | X |

*: The surface of the transfer medium had a temperature of 100° C. for the device (1) and was not heated (25° C.) for the conventional device.

TABLE 2

| Inks | Recording device | (1) Jetting stability | (2) Clogging | (3) Print density | (4) Edge sharpness | (5) Adaptability to paper | (6) Rubbing resistance | (7) Water resistance | (8) Quick drying |
|---|---|---|---|---|---|---|---|---|---|
| Example 2 | Device (1) | O | O | O | O | O | O | O | O |
| Example 3 | " | O | O | O | O | O | O | O | O |
| Example 4 | " | O | O | O | O | O | O | O | O |
| Example 5 | " | O | O | O | O | O | O | O | O |
| Example 6 | " | O | O | O | O | O | O | O | O |
| Example 7 | " | O | O | O | O | O | O | O | O |
| Example 8 | " | O | O | O | O | O | O | O | O |
| Example 9 | " | O | O | O | O | O | O | O | O |
| Example 10 | " | O | O | O | O | O | O | O | O |
| Example 2 | Conventional Device | O | O | Δ | X | X | X | Δ | X |
| Example 3 | " | O | O | Δ | X | X | X | Δ | X |
| Example 4 | " | O | O | Δ | X | X | X | X | X |
| Example 5 | " | O | O | X | X | X | X | Δ | X |
| Example 6 | " | O | O | X | X | X | X | X | X |
| Example 7 | " | O | O | O | X | Δ | Δ | X | Δ |
| Example 8 | " | O | O | O | X | Δ | Δ | X | Δ |
| Example 9 | " | O | O | Δ | X | X | X | Δ | X |
| Example 10 | " | O | O | X | X | X | X | Δ | X |
| Comparative Example 2 | Device (1) | O | O | X | X | Δ | X | X | O |
| Comparative Example 3 | " | O | O | X | X | X | X | Δ | X |
| Comparative Example 4 | " | Δ | X | Δ | Δ | Δ | O | O | O |

TABLE 3

| Inks | Recording device | (1) Jetting stability | (2) Clogging | (3) Print density | (4) Edge sharpness | (5) Adaptability to paper | (6) Rubbing resistance | (7) Water resistance | (8) Quick drying |
|---|---|---|---|---|---|---|---|---|---|
| Example 11 | Device (1) | O | O | O | O | O | O | O | O |
| Example 12 | " | O | O | O | O | O | O | O | O |
| Example 13 | " | O | O | O | O | O | O | O | O |
| Example 14 | " | O | O | O | O | O | O | O | O |
| Example 15 | " | O | O | O | O | O | O | O | O |
| Example 16 | " | O | O | O | O | O | O | O | O |
| Example 17 | " | O | O | O | O | O | O | O | O |
| Example 11 | Conventional Device | O | O | Δ | X | X | X | Δ | X |
| Example 12 | " | O | O | Δ | X | X | X | Δ | X |
| Example 13 | " | O | O | Δ | X | X | X | X | X |
| Example 14 | " | O | O | X | X | X | X | Δ | X |
| Example 15 | " | O | O | X | X | X | X | X | X |
| Example 16 | " | O | O | Δ | X | X | X | Δ~O | X |
| Example 17 | " | O | O | Δ | X | X | X | Δ~O | X |
| Comparative Example 5 | Device (1) | O | O | Δ | Δ | Δ | X | Δ | X |
| Comparative | " | Δ | X | Δ | Δ | X | X | Δ | O |

TABLE 3-continued

| Inks | Recording device | Evaluation items | | | | | | | |
|---|---|---|---|---|---|---|---|---|---|
| | | (1) Jetting stability | (2) Clogging | (3) Print density | (4) Edge sharpness | (5) Adaptability to paper | (6) Rubbing resistance | (7) Water resistance | (8) Quick drying |
| Example 6 Comparative Example 7 | " | Δ | X | Δ | Δ | Δ | ○ | ○ | ○ |
| Comparative Example 8 | " | X | Δ~X | ○ | ○ | ○ | ○ | ○ | ○ |

TABLE 4

| Inks | Recording device | Evaluation item | Surface temperature of transfer medium (°C.) | | | | | |
|---|---|---|---|---|---|---|---|---|
| | | | 50 | 70 | 90 | 140 | 160 | 180 |
| Example 18 | Device (1) | (10) | X | ⊙ | ⊙ | ⊙ | ⊙ | X |
| | " | (13) | X | ○ | ○ | ○ | ○ | X |
| | " | (14) | X | ○ | ○ | ○ | ○ | X |
| Example 19 | " | (10) | X | ⊙~○ | ⊙ | ⊙ | ⊙~○ | X |
| | " | (13) | X | ○~Δ | ○ | ○ | ○ | X |
| | " | (14) | X | ○ | ○ | ○ | ○ | X |
| Example 20 | " | (10) | X | X | ⊙ | ⊙ | ⊙ | X |
| | " | (13) | X | ○~Δ | ○ | ○ | ○ | X |
| | " | (14) | X | ○ | ○ | ○ | ○ | X |
| Comparative Example 9 | " | (10) | X | X | X | X | X | X |
| | " | (13) | X | X | X | X | X | X |
| | " | (14) | X | X | X | X | X | X |

TABLE 5

| Inks | Recording device | Evaluation items | | | | | | | |
|---|---|---|---|---|---|---|---|---|---|
| | | (1) Jetting stability | (2) Clogging | (3) Print density | (4) Edge sharpness | (5) Adaptability to paper | (6) Rubbing resistance | (7) Water resistance | (8) Quick drying |
| Example 21 | Device (1) | ○ | ○ | ○ | ○ | ○~Δ | ○ | ○ | ○ |
| Example 22 | " | ○ | ○ | ○ | ○ | ○~Δ | ○ | ○ | ○ |
| Example 23 | " | ○ | ○ | ○ | ○ | ○~Δ | ○ | ○ | ○ |
| Example 24 | " | ○ | ○ | ○ | ○ | ○~Δ | ○ | ○ | ○ |
| Example 25 | " | ○ | ○ | ○ | ○ | ○~Δ | ○ | ○ | ○ |
| Example 26 | " | ○ | ○ | ○ | ○ | ○~Δ | ○ | ○ | ○ |
| Example 21 | Device (2) | ○ | ○ | ○ | ○ | ○ | ○ | ○ | ○ |
| Example 22 | " | ○ | ○ | ○ | ○ | ○ | ○ | ○ | ○ |
| Example 23 | " | ○ | ○ | ○ | ○ | ○ | ○ | ○ | ○ |
| Example 24 | " | ○ | ○ | ○ | ○ | ○ | ○ | ○ | ○ |
| Example 25 | " | ○ | ○ | ○ | ○ | ○ | ○ | ○ | ○ |
| Example 26 | " | ○ | ○ | ○ | ○ | ○ | ○ | ○ | ○ |
| Example 21 | Conventional Device | ○ | ○ | X | X | X | X | X | Δ |
| Example 22 | " | ○ | ○ | Δ | X | X | X | X | X |
| Example 23 | " | ○ | ○ | Δ | X | X | X | X | Δ |
| Example 24 | " | ○ | ○ | X | X | X | X | X | X |
| Example 25 | " | ○ | ○ | X | X | X | X | X | Δ |
| Example 26 | " | ○ | ○ | X | X | X | Δ | X | Δ |
| Comparative Example 10 | Device (2) | ○ | ○ | X | X | Δ | X | X | ○ |
| Comparative Example 11 | " | X | X | Δ | X | X | ○ | ○ | ○ |
| Comparative Example 12 | " | X | X | ○ | ○ | ○ | Δ | ○ | X |
| Comparative Example 13 | " | ○ | ○ | Δ | Δ | Δ | X | X | ○ |

TABLE 6

| Inks | Recording device | (1) Jetting stability | (2) Clogging | (3) Print density | (4) Edge sharpness | (5) Adaptability to paper | (6) Rubbing resistance | (7) Water resistance | (8) Quick drying |
|---|---|---|---|---|---|---|---|---|---|
| Example 27 | Device (2) | ○ | ○ | ○ | ○ | ○ | ○ | ○ | ○ |
| Example 28 | " | ○ | ○ | ○ | ○ | ○ | ○ | ○ | ○ |
| Example 29 | " | Δ | Δ | ○ | ○ | ○ | ○ | ○ | ○ |
| Example 30 | " | ○ | ○ | ○ | ○ | ○ | ○ | ○ | ○ |
| Example 27 | Conventional Device | ○ | ○ | Δ | Δ | ○ | X | Δ | X |
| Example 28 | " | ○ | ○ | Δ | Δ | ○ | X | Δ | X |
| Example 29 | " | Δ | Δ | Δ | Δ | ○ | Δ | ○ | Δ |
| Example 30 | " | ○ | ○ | Δ | Δ | ○ | X | X | X |
| Comparative Example 14 | Device (2) | ○ | Δ | Δ | X | Δ | X | X | Δ |
| Comparative Example 15 | " | X | X | X | X | Δ | Δ | Δ | ○ |

TABLE 7

| Inks | Recording device | (1) Jetting stability | (2) Clogging | (3) Print density | (4) Edge sharpness | (5) Adaptability to paper | (6) Rubbing resistance | (7) Water resistance | (8) Quick drying | (9) Storage stability |
|---|---|---|---|---|---|---|---|---|---|---|
| Example 31 | Device (2) | ○ | ○ | ○ | ○ | ○ | ○ | ○ | ○ | ○ |
| Example 32 | " | ○ | ○ | ○ | ○ | ○ | ○ | ○ | ○ | ○ |
| Example 33 | " | ○ | ○ | ○ | ○ | ○ | ○ | ○ | ○ | ○ |
| Example 34 | " | ○ | ○ | ○ | ○ | ○ | ○ | ○ | ○ | ○ |
| Example 35 | " | ○ | ○ | ○ | ○ | ○ | ○ | ○ | ○ | ○ |
| Example 36 | " | ○ | ○ | ○ | ○ | ○ | ○ | ○ | ○ | ○ |
| Example 31 | Conventional Device | ○ | ○ | Δ | Δ | ○ | X | X | X | ○ |
| Example 32 | " | ○ | ○ | Δ | Δ | ○ | X | X | X | ○ |
| Example 33 | " | ○ | ○ | Δ | Δ | ○ | X | X | X | ○ |
| Example 34 | " | ○ | ○ | Δ | Δ | ○ | X | X | X | ○ |
| Example 35 | " | ○ | ○ | Δ | Δ | ○ | X | X | X | ○ |
| Example 36 | " | ○ | ○ | Δ | Δ | ○ | X | X | X | ○ |
| Comparative Example 16 | Device (2) | ○ | ○ | X | X | Δ | X | X | ○ | ○ |
| Comparative Example 17 | " | ○ | ○ | X | X | X | ○ | ○ | ○ | ○ |
| Comparative Example 18 | " | X | X | ○ | ○ | ○ | Δ | ○ | ○ | X |
| Comparative Example 19 | " | ○ | ○ | Δ | Δ | ○ | X | X | ○ | ○ |

TABLE 8

| Ink | Recording device | (16) Transfer efficiency 0.6 kg/cm 100% duty printing after 2 sec. | 0.6 kg/cm Line printing after 10 sec. | 1.0 kg/cm 100% duty printing after 2 sec. | 1.0 kg/cm Line printing after 10 sec. | 1.5 kg/cm 100% duty printing after 2 sec. | 1.5 kg/cm Line printing after 10 sec. | (6) Rubbing resistance | (7) Water resistance |
|---|---|---|---|---|---|---|---|---|---|
| Example 37 | Device (1) | ○ | ○ | ○ | ○ | ○ | ○ | ○ | ○ |
| Example 38 | " | ○ | ○ | ○ | ○ | ○ | ○ | ○ | ○ |
| Example 39 | " | ○ | ○ | ○ | ○ | ○ | ○ | ○ | ○ |
| Example 37 | Device (2) | ○ | ○ | ○ | ○ | ○ | ○ | ○ | ○ |
| Example 38 | " | ○ | ○ | ○ | ○ | ○ | ○ | ○ | ○ |
| Example 39 | " | ○ | ○ | ○ | ○ | ○ | ○ | ○ | ○ |
| Example 37 | Conventional device | ○ | ○ | ○ | ○ | ○ | ○ | X | X |

We claim:

1. An intermediate transfer ink jet recording method comprising the steps of:

ejecting an ink composition comprising water, a thermoplastic resin, a colorant and a water-soluble organic solvent on an intermediate transfer medium to form an ink image having a first shape;

heating said ink image to a heated state at or above the softening or melting temperature of said thermoplastic resin so as to bring the ink image on the intermediate transfer medium into the form of a film having a surface that is viscous, whereby the ink image in the heated state has a second shape, said second shape having a thickness of 2–10 microns; and interfacially transferring said ink image in the heated state on said transfer medium to a recording medium so as substantially to maintain said second shape.

2. The ink jet recording method according to claim 1, wherein the softening or melting temperature of the thermoplastic resin contained in the ink composition is in the range of from 50° to 150° C.

3. The ink jet recording method according to claim 1, wherein said thermoplastic resin contained in the ink composition is a water-insoluble resin.

4. The ink jet recording method according to claim 3, wherein said water-insoluble resin contained in said ink composition is in the form of a resin emulsion.

5. The ink jet recording method according to claim 1, wherein said thermoplastic resin contained in said ink composition is a water-soluble resin.

6. The ink jet recording method according to claim 1, wherein said thermoplastic resin and said colorant contained in said ink composition are integrated with each other to form colored resin particles.

7. The ink jet recording method according to claim 1, wherein said ink composition further comprises a surfactant.

8. The ink jet recording method according to claim 1, wherein said ink composition further comprises a water-soluble polymer.

9. The ink jet recording method according to claim 1, wherein said ink composition further comprises a saccharide.

10. The ink jet recording method according to claim 1, wherein said temperature of at least the softening or melting temperature of said thermoplastic resin is in the range of from 50° to 200° C.

11. An intermediate transfer ink jet recording method comprising the steps of:

ejecting an ink composition comprising water, a thermoplastic resin, a colorant and a water-soluble organic solvent and, when said thermoplastic resin is a water-insoluble resin, further comprising a water-soluble polymer on an intermediate transfer medium to form an ink image having a first shape;

concentrating said ink image by heating to a heated state in a first heating so as to bring the ink image on the intermediate transfer medium into the form of a film having a surface that is viscous, whereby the ink image in the heated state has a second shape said second shape having a thickness of 2–10 microns;

interfacially transferring said ink image in the heated state on said transfer medium to a recording medium so as substantially to maintain said second shape; and heating said ink image in a second heating on said recording medium to at least the softening or melting temperature of said thermoplastic resin.

12. The ink jet recording method according to claim 11, wherein the softening or melting temperature of the thermoplastic resin contained in the ink composition is in the range of from 50° to 150° C.

13. The ink jet recording method according to claim 11, wherein said thermoplastic resin contained in the ink composition is a water-insoluble resin.

14. The ink jet recording method according to claim 13, wherein said water-insoluble resin contained in said ink composition is in the form of a resin emulsion.

15. The ink jet recording method according to claim 11, wherein said thermoplastic resin contained in said ink composition is a water-soluble resin.

16. The ink jet recording method according to claim 11, wherein said thermoplastic resin and said colorant contained in said ink composition are integrated with each other to form colored resin particles.

17. The ink jet recording method according to claim 11, wherein said ink composition further comprises a surfactant.

18. The ink jet recording method according to claim 11, wherein said ink composition further comprises a water-soluble polymer.

19. The ink jet recording method according to claim 11, wherein said ink composition further comprises a saccharide.

20. The ink jet recording method according to claim 11, wherein said temperature of at least the softening or melting temperature of said thermoplastic resin is in the range of from 50° to 200° C.

* * * * *